(12) United States Patent
Yoshii et al.

(10) Patent No.: US 8,090,716 B2
(45) Date of Patent: Jan. 3, 2012

(54) INFORMATION-PROCESSING APPARATUS, INFORMATION-PROCESSING METHOD, AND COMPUTER-READABLE STORAGE MEDIUM

(75) Inventors: Shinichiro Yoshii, Tokyo (JP); Yumi Kawachi, Tokyo (JP)

(73) Assignee: Scigineer, Inc., Tokyo (JP)

( * ) Notice: Subject to any disclaimer, the term of this patent is extended or adjusted under 35 U.S.C. 154(b) by 400 days.

(21) Appl. No.: 12/369,934

(22) Filed: Feb. 12, 2009

(65) Prior Publication Data

US 2009/0204634 A1 Aug. 13, 2009

(30) Foreign Application Priority Data

Feb. 12, 2008 (JP) ................................. 2008-029997

(51) Int. Cl.
*G06F 7/00* (2006.01)
(52) U.S. Cl. ........ 707/726; 707/732; 707/737; 707/797; 707/798
(58) Field of Classification Search .................. 707/726, 707/732, 737, 797, 798
See application file for complete search history.

(56) References Cited

U.S. PATENT DOCUMENTS

2002/0198882 A1* 12/2002 Linden et al. ................... 707/10
2007/0185775 A1*  8/2007 Lawton ............................ 705/26

FOREIGN PATENT DOCUMENTS

| JP | 2002117292 | 4/2002 |
| JP | 2004362011 | 12/2004 |
| JP | 2005092721 | 4/2005 |
| JP | 2005293384 | 10/2005 |

OTHER PUBLICATIONS

Balabanovic, M., et al., "Fab: Content-Based, Collaborative Recommendation. (Special Section: Recommender Systems)," Communications of the ACM 1997;40(3):66-72.
Herlocker, J. L., et al., "An Algorithmic Framework for Performing Collaborative Filtering," Proceedings of the 22nd Annual International ACM SIGIR 1999:230-237.
Linden, G., et al., "Amazon.com Recommendations: Item-to-Item Collaborative Filtering," IEEE Internet Computing 2003;7:76-80.
Resnick, P., et al., "GroupLens: An Open Architecture for Collaborative Filtering of Netnews," Proceedings of the 1994 Computer Supported Collaborative Work Conference 1994:175-186.
Sarwar, B., et al., "Item-Based Collaborative Filtering Recommendation Algorithms," Proceedings of the 10th International Conference on World Wide Web 2001:285-295.

* cited by examiner

*Primary Examiner* — Apu Mofiz
*Assistant Examiner* — Cindy Nguyen
(74) *Attorney, Agent, or Firm* — Cermak Nakajima LLP; Tomoko Nakajima

(57) ABSTRACT

An information-processing apparatus includes: a link information-generating portion that reads two or more pieces of operation information having a user identifier and an object identifier for identifying an object on which a user has performed an operation, detects two or more object identifiers linked via a user identifier contained in the two or more pieces of operation information, and generates link information indicating a link relationship between two or more objects; an object identifier-accepting portion that accepts one object identifier; an in-group object identifier-acquiring portion that acquires an object identifier having at least a predetermined level of relevance with the one object identifier accepted by the object identifier-accepting portion, using the generated link information; and an in-group object information output portion that outputs object information, which is information related to an object identified with the object identifier acquired by the in-group object identifier-acquiring portion.

20 Claims, 29 Drawing Sheets

| ID | Object identifier | Object | | | | | | |
|---|---|---|---|---|---|---|---|---|
| | | Product name | Product type | Size | Color | Price | ......... | Image |
| 1 | 1 | trousers X | trousers | 7~13 | black | 8000 yen | ......... |  |
| ⋮ | ⋮ | ⋮ | ⋮ | ⋮ | ⋮ | ⋮ | ......... | ⋮ |
| 5 | 5 | trousers Y | trousers | 7~13 | brown | 9500 yen | ......... |  |
| 6 | 6 | J1-XX | jacket | S,M,L | blue/ yellow | 35000 yen | ......... |  |
| 7 | 7 | J2-XY | jacket | S,M,L | brown | 38000 yen | ......... |  |
| ⋮ | ⋮ | ⋮ | ⋮ | ⋮ | ⋮ | ⋮ | ......... | ⋮ |
| 9 | 9 | SS1 | shoes | 21~27 | black | 12000 yen | ......... |  |
| 10 | 10 | SS2 | shoes | 21~27 | white | 8000 yen | ......... |  |
| ⋮ | ⋮ | ⋮ | ⋮ | ⋮ | ⋮ | ⋮ | ......... | ⋮ |

| ID | Operation Information | | |
|---|---|---|---|
| | User identifier | Object identifier | Time period information |
| 1 | A | 1 | 2006/1/18 13:15 |
| 2 | C | 2 | 2006/1/18 13:25 |
| 3 | B | 1 | 2006/1/18 13:28 |
| 4 | B | 3 | ⋮ |
| 5 | B | 9 | ⋮ |
| 6 | A | 4 | ⋮ |
| 7 | B | 5 | ⋮ |
| 8 | D | 10 | ⋮ |
| 9 | E | 5 | ⋮ |
| 10 | C | 7 | ⋮ |
| ⋮ | ⋮ | ⋮ | ⋮ |

FIG.11

| User \ Product | 1 | 2 | 3 | 4 | 5 | 6 | 7 | 8 | 9 | 10 |
|---|---|---|---|---|---|---|---|---|---|---|
| A | ○ |   |   | ○ |   |   |   | ○ |   |   |
| B | ○ |   | ○ |   | ○ |   |   |   | ○ |   |
| C |   | ○ |   |   |   |   | ○ |   | ○ | ○ |
| D |   |   |   |   |   | ○ | ○ |   |   | ○ |
| E |   |   | ○ |   | ○ |   |   |   | ○ |   |
| F |   |   |   |   | ○ |   | ○ |   | ○ |   |

FIG.12

| | |
|---|---|
| (1,4) | (6,7) |
| (1,8) | (6,10) |
| (4,8) | (7,10) |
| (1,3) | (3,5) |
| (1,5) | (3,9) |
| (1,9) | (5,9) |
| (3,5) | (5,7) |
| (3,9) | (5,9) |
| (5,9) | (7,9) |
| (2,7) | |
| (2,9) | |
| (2,10) | |
| (7,9) | |
| (7,10) | |
| (9,10) | |

FIG.13

| (1,3,1) |
|---|
| (1,4,1) |
| (1,5,1) |
| (1,8,1) |
| (1,9,1) |
| (2,7,1) |
| (2,9,1) |
| (2,10,1) |
| (3,5,2) |
| (3,9,2) |
| (4,8,1) |
| (5,7,1) |
| (5,9,3) |
| (6,7,1) |
| (6,10,1) |
| (7,9,2) |
| (7,10,2) |
| (9,10,1) |

FIG.14

| ID | Object identifier | Object | | | |
|---|---|---|---|---|---|
| | | Music title | Genre | ... | Jacket (image) |
| 1 | 1 | XYZ | pop | ... |  |
| 2 | 2 | AAX | anime | ... |  |
| 3 | 3 | ZCZ | jazz | ... |  |
| 4 | 4 | PPP | blues | ... |  |
| 5 | 5 | Z2Y | rock | ... |  |
| 6 | 6 | ATN | jazz | ... |  |
| 7 | 7 | QTX | rock | ... |  |
| 8 | 8 | CDF | ballad | ... |  |
| 9 | 9 | FM5 | blues | ... |  |
| 10 | 10 | Z57 | pop | ... |  |
| ⋮ | ⋮ | ⋮ | ⋮ | ⋮ | ⋮ |

| ID | Operation Information | | |
|---|---|---|---|
| | User identifier | Object identifier | Keyword |
| 1 | A | 1 | light |
| 2 | C | 2 | rhythmical |
| 3 | B | 1 | warrior |
| 4 | B | 4 | light |
| 5 | B | 4 | nature |
| 6 | A | 3 | sea |
| 7 | B | 5 | star |
| 8 | D | 2 | nature |
| 9 | E | 5 | light |
| 10 | C | 9 | sea |
| ⋮ | ⋮ | ⋮ | ⋮ |

FIG.23

| |
|---|
| (1, 4) |
| (1, 5) |
| (1, 6) |
| (4, 5) |
| (4, 6) |
| (5, 6) |
| (2, 7) |
| (1, 8) |
| (2, 4) |
| (2, 6) |
| (2, 7) |
| (2, 9) |
| (4, 6) |
| (4, 7) |
| (4, 9) |
| (6, 7) |
| (6, 9) |
| (7, 9) |
| (3, 8) |
| (3, 9) |
| (8, 9) |
| (1, 5) |
| (1, 8) |
| (1, 10) |
| (5, 8) |
| (5, 10) |
| (8, 10) |

FIG.25

| |
|---|
| (1, 4, 1) |
| (1, 5, 2) |
| (1, 6, 1) |
| (1, 8, 2) |
| (1, 10, 1) |
| (2, 4, 1) |
| (2, 6, 1) |
| (2, 7, 2) |
| (2, 9, 1) |
| (3, 8, 1) |
| (3, 9, 1) |
| (4, 5, 1) |
| (4, 6, 2) |
| (4, 7, 1) |
| (4, 9, 1) |
| (5, 6, 1) |
| (5, 8, 1) |
| (5, 10, 1) |
| (6, 7, 1) |
| (6, 9, 1) |
| (7, 9, 1) |
| (8, 9, 1) |
| (8, 10, 1) |

FIG.26

INFORMATION-PROCESSING APPARATUS, INFORMATION-PROCESSING METHOD, AND COMPUTER-READABLE STORAGE MEDIUM

This application claims the priority benefit under 35 U.S.C. §119 of Japanese Patent Application No. 2008-029997 filed on Feb. 12, 2008, which is hereby incorporated in its entirety by reference.

BACKGROUND OF THE INVENTION

1. Field of the Invention

The present invention relates to information-processing apparatuses and the like for providing, for example, recommendation information using information such as the purchase history of products purchased by two or more users.

2. Description of Related Art

Conventionally, there is an information-processing system for simultaneously realizing both a content recommendation with more pertinence based on the name and the value of an item that a user is strongly interested in and a content recommendation in consideration of the sequentially of content utilization (see JP 2005-293384A (p. 1, FIG. 1, etc.)). This system has a content usage history information storage and management portion in which the content usage history information of a user is stored and managed, a content usage shift information-computing portion that computes content usage shift information based on the content usage history information, a content usage shift information storage and management portion in which the content usage shift information is stored and managed, a content metadata information storage and management portion in which content metadata information is stored and managed, and a content recommendation information-generating portion that generates content recommendation information based on the content usage history information, the content usage shift information, and the content metadata information.

Furthermore, there is a system for extracting the characteristics of each item name for an individual, and recommending content based on the characteristics of each item name for the individual (see JP 2004-362011A (p. 1, FIG. 1, etc.)). In this system, the user's item-categorized preference information of a targeted user is acquired with respect to preset item names. Reference is made to the acquired user's item-categorized preference information, and if an item name appears a number of times equal to or larger than a threshold value preset for the item name, then its item value is extracted. Accordingly, content information containing this item value as the value of a target item name is acquired, and the acquired content information is recommended to the user.

Furthermore, there is a system for improving the possibility of realizing product purchase and for providing a comprehensive recommendation service (see JP 2002-117292A (p. 1, FIG. 1, etc.)). In this system, if a user accesses a server of a music distribution shop A via a network connection service using a mobile phone and purchases music software, then the server of the shop A transmits the purchase information to a center, and the center searches for concert information for the singer following its recommendation rules, and transmits the recommendation to the mobile phone via a network connection service. Also, in this system, if the user purchases a concert ticket using the mobile phone from a server of a ticket shop B, then the server of the shop B transmits the purchase information to the center, and the center searches for the reservation status of an airplane and the like on the concert day in this purchase information, following its recommendation rules, and transmits the recommendation to the mobile phone.

Furthermore, there is the technique of a recommendation engine named GroupLens that automatically ranks netnews (Resnick, P., Iacovou, N., Suchak, M., Bergstrom, P., Riedl, J.: GroupLens: An Open Architecture for Collaborative Filtering of Netnews. Proceedings of the 1994 Computer Supported Collaborative Work Conference, pp. 175-186 (1994)). Moreover, a lot of research has been conducted on recommendation based on collaborative filtering (Balabanovic, M. and Shoham, Y.: Fab: Content-Based, Collaborative Recommendation. Communications of the ACM, Vol. 40, Issue 3, pp. 66-72 (1997), Herlocker, J. L., Konstan, J. A., Borchers, A. and Riedl, J.: An Algorithmic Framework for Performing Collaborative Filtering, Proceedings of the 22nd annual international ACM SIGIR, pp. 230-237 (1999), Sarwar, B., Karypis, G., Konstan, J. and Riedl, J.: Item-Based Collaborative Filtering Recommendation Algorithms, Proceedings of the 10th International Conference on World Wide Web, pp. 285-295 (2001), and Linden, G., Smith, B., and York, J.: Amazon.com Recommendations: Item-to-Item Collaborative Filtering, Internet Computing, IEEE, Volume 7, pp. 76-80 (2003)).

However, in conventional systems, objects have not been grouped using a history of operations (e.g., purchases, browsing of information, etc.) performed by users on one or more objects (e.g., products or services).

Furthermore, objects have not been grouped using input information, which is information on objects input by users.

Moreover, in the case where an object that users are interested in is dynamically changed, for example, a process of dynamically acquiring a group to which the object belongs and recommending another object in the group has not been performed.

Thus, the precision in recommending products and the like has been low.

SUMMARY OF THE INVENTION

A first aspect of the present invention is directed to an information-processing apparatus, comprising: an operation information storage portion in which at least two pieces of operation information having a user identifier for identifying a user and an object identifier for identifying an object on which the user has performed an operation can be stored; a link information-generating portion that reads at least two pieces of operation information from the operation information storage portion, detects at least two object identifiers linked via a user identifier contained in the at least two pieces of operation information, and generates link information, which is information indicating a link relationship between at least two objects and is information indicating a level of the link relationship between the at least two objects; an object identifier-accepting portion that accepts one object identifier; an in-group object identifier-acquiring portion that acquires an object identifier having at least a predetermined level of relevance with the one object identifier accepted by the object identifier-accepting portion, using the link information generated by the link information-generating portion; and an in-group object information output portion that outputs object information, which is the object identifier acquired by the in-group object identifier-acquiring portion or information related to an object identified with the object identifier.

With this configuration, the precision in recommending products and the like can be improved.

A second aspect of the present invention is directed to the information-processing apparatus according to the first aspect, wherein the operation information contains an object identifier and input information, which is information input by a user, and the link information-generating portion reads at least two pieces of operation information from the operation information storage portion, detects at least two object identifiers linked via input information contained in the at least two pieces of operation information, and generates link information, which is information indicating a link relationship between at least two objects and is information indicating a level of the link relationship between the at least two objects.

With this configuration, the precision in recommending products and the like can be improved.

A third aspect of the present invention is directed to the information-processing apparatus according to the second aspect, wherein the input information is color information indicating a user's impression of an object identified with the object identifier.

With this configuration, the precision in recommending products and the like can be improved.

A fourth aspect of the present invention is directed to the information-processing apparatus according to the second aspect, wherein the input information is a keyword indicating a user's impression of an object identified with the object identifier.

With this configuration, the precision in recommending products and the like can be improved.

A fifth aspect of the present invention is directed to the information-processing apparatus according to any one of the first to fourth aspects, wherein the object identifier-accepting portion receives one object identifier from a terminal apparatus, and the in-group object information output portion transmits object information, which is the object identifier acquired by the in-group object identifier-acquiring portion or information related to an object identified with the object identifier, to the terminal apparatus.

With this configuration, the precision in recommending products and the like can be improved.

A sixth aspect of the present invention is directed to the information-processing apparatus according to any one of the first to fifth aspects, further comprising: an operation information-accepting portion that accepts the operation information; and an operation information-accumulating portion that accumulates the operation information accepted by the operation information-accepting portion in the operation information storage portion.

With this configuration, the precision in recommending products and the like can be improved.

With the information-processing system according to the present invention, the precision in recommending products and the like can be improved.

BRIEF DESCRIPTION OF THE DRAWINGS

FIG. 11 is a diagram showing an operation information management table in this embodiment.

FIG. 12 is a diagram showing information that can be acquired from the operation information management table in this embodiment.

FIG. 13 is a diagram showing a data group acquired by a link information-generating portion in this embodiment.

FIG. 14 is a diagram showing a link information group in this embodiment.

FIG. 23 is a diagram showing an operation information management table in this embodiment.

FIG. 25 is a diagram showing a data group acquired by a link information-generating portion in this embodiment.

FIG. 26 is a diagram showing a link information group in this embodiment.

DETAILED DESCRIPTION OF THE INVENTION

Figure 1:
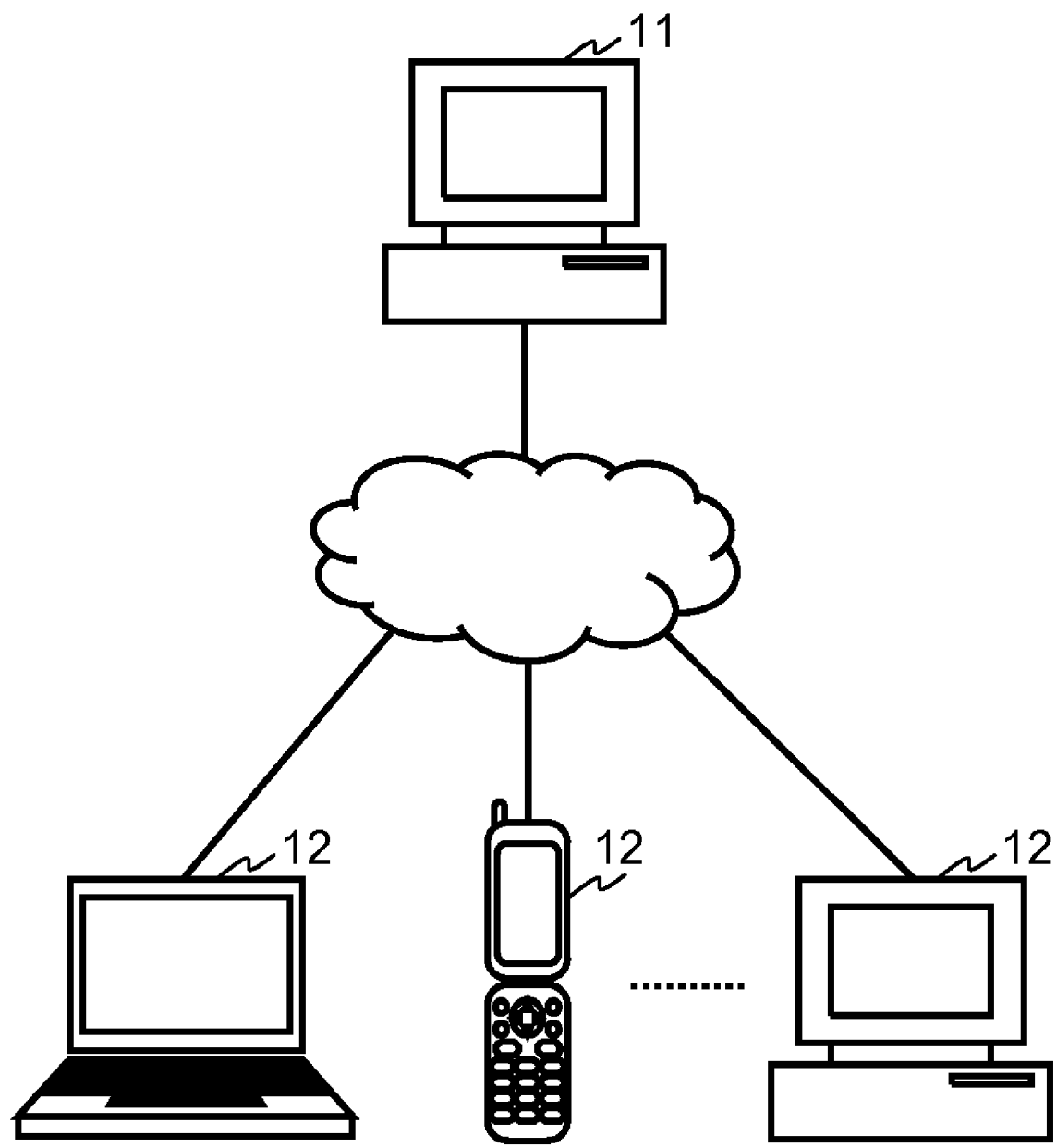
FIG. 1 is a conceptual diagram of an information-processing system in Embodiment 1.

Hereinafter, an embodiment of an information-processing system and the like will be described with reference to the drawings. It should be noted that constituent elements denoted by the same reference numerals in the embodiments perform similar operations, and, thus, a description thereof may not be repeated.

Embodiment 1

In this embodiment, an information-processing system 1 will be described that accepts operations (purchases, browsing, bookmarking, tagging, input of attribute values, etc.) of two or more users on two or more objects (products, contents, services, etc.), generates information on link relationships between the objects based on the operations, acquires one or more objects belonging to the same group as one object based on the information on the link relationship, and outputs the one or more objects.

FIG. 1 is a conceptual diagram of the information-processing system 1 in this embodiment. The information-processing system 1 includes an information-processing apparatus 11 and one or more terminal apparatuses 12. The information-processing apparatus 11 and the terminal apparatuses 12 are connected, for example, via a network such as the Internet, and can communicate with each other. For example, the information-processing apparatus 11 is a server apparatus on the network, and the terminal apparatuses 12 are user terminals.

Figure 2:
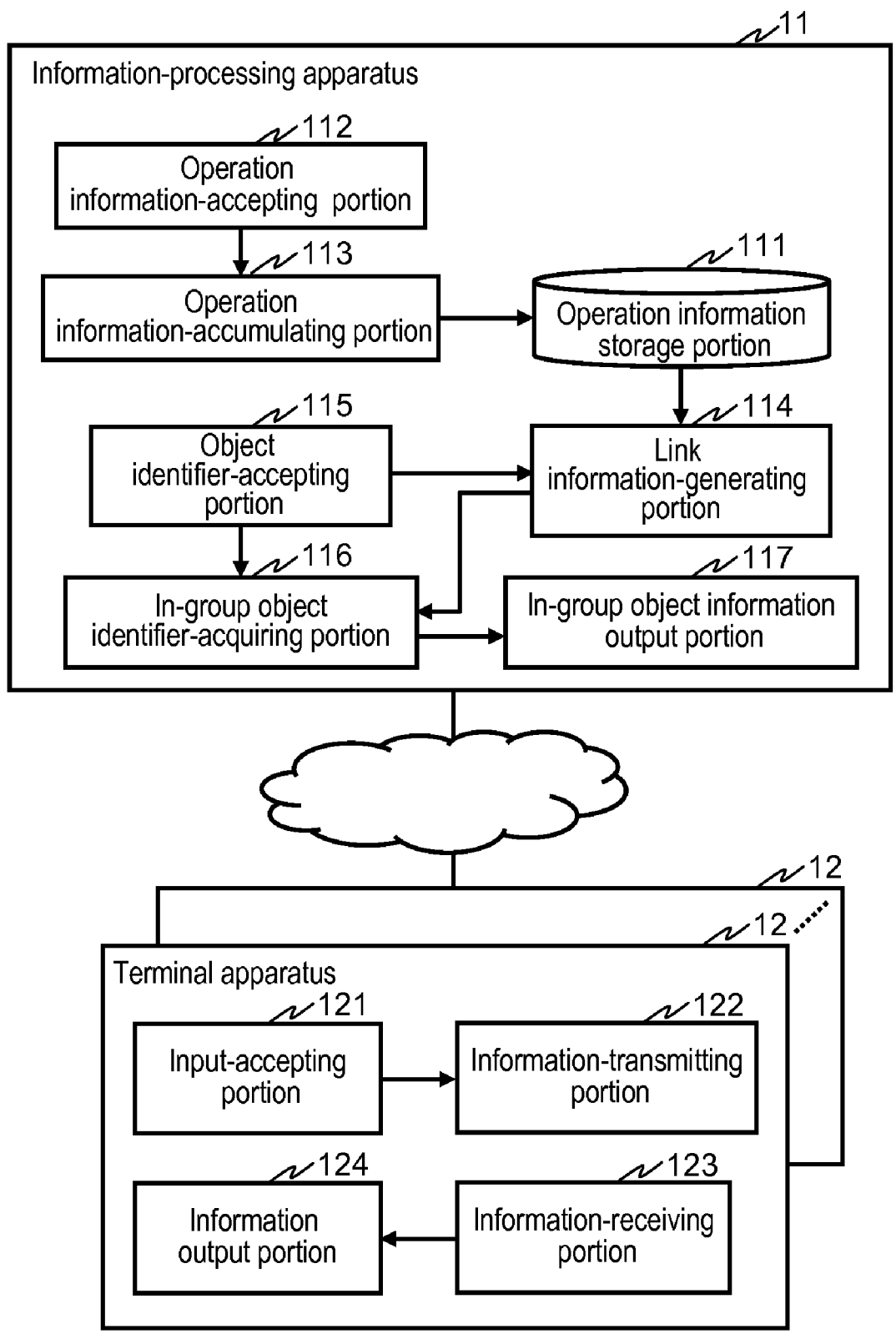
FIG. 2 is a block diagram of the information-processing system in this embodiment.

FIG. 2 is a block diagram of the information-processing system 1 in this embodiment. The information-processing apparatus 11 includes an operation information storage portion 111, an operation information-accepting portion 112, an operation information-accumulating portion 113, a link information-generating portion 114, an object identifier-accepting portion 115, an in-group object identifier-acquiring portion 116, and an in-group object information output portion 117.

The terminal apparatus 12 includes an input-accepting portion 121, an information-transmitting portion 122, an information-receiving portion 123, and an information output portion 124.

In the operation information storage portion 111, two or more pieces of operation information can be stored. The operation information has a user identifier for identifying a user and an object identifier for identifying an object on which the user has performed an operation. Here, the user identifier is, for example, IDs, names, or the like. Furthermore, the operation refers to an operation for purchasing a product or service displayed on the screen of the terminal apparatus 12 (an operation of pressing a purchase button, etc.), an operation of browsing information on a product or service displayed on the screen of the terminal apparatus 12, an operation of registering a product or service displayed on the screen of the terminal apparatus 12 in a bookmark list, an operation of inputting the input information described in Embodiment 2, an operation of providing some sort of mark (tag, etc.), an operation of inputting an attribute value, or the like. The object refers to products, services, people, or the like. The object identifier refers to IDs such as product IDs or service IDs, names, or the like. The operation information storage portion 111 is preferably a non-volatile storage medium, but can be realized also as a volatile storage medium. There is no limitation on the procedure in which operation information is stored in the operation information storage portion 111. For example, the operation information may be stored in the operation information storage portion 111 via a storage medium, the operation information transmitted via a communication line or the like may be stored in the operation information storage portion 111, or the operation information input via an input device may be stored in the operation information storage portion 111.

The operation information-accepting portion 112 accepts the operation information. An accepting operation herein is typically a receiving operation. However, an accepting operation may be an operation of accepting input from a user. The operation information-accepting portion 112 is realized typically as a wireless or wired communication unit, but also may be realized as a unit that receives a broadcast.

The operation information-accumulating portion 113 accumulates the operation information accepted by the operation information-accepting portion 112, in the operation information storage portion 111. The operation information-accumulating portion 113 may be realized typically as an MPU, a memory, or the like. Typically, the processing procedure of the operation information-accumulating portion 113 is realized using software, and the software is stored in a storage medium such as a ROM. Note that the processing procedure also may be realized using hardware (dedicated circuit).

The link information-generating portion 114 generates link information using two or more pieces of operation information stored in the operation information storage portion 111. More specifically, the link information-generating portion 114 reads the two or more pieces of operation information from the operation information storage portion 111, detects two or more object identifiers linked via a user identifier contained in the two or more pieces of operation information, and generates link information, which is information indicating the link relationship between two or more objects and is information indicating the level of the link between the two or more objects. The phrase 'detect two or more object identifiers linked via a user identifier' refers to successive processes of judging that two object identifiers paired with the same user identifier (may be considered to include an attribute value that can be acquired by the user identifier (e.g., age, age range, sex, hobby, residential area, organization to which the user belongs, etc.)) are related to each other, linking the two object identifiers, and acquiring the linked two object identifiers. Furthermore, the phrase 'detect two or more object identifiers linked via a user identifier' refers to a process of acquiring all pairs of two object identifiers among two or more object identifiers paired with the same user identifier (may be considered to include an attribute value that can be acquired by the user identifier (e.g., age, age range, sex, hobby, residential area, organization to which the user belongs, etc.)). The link information has information on all pairs of two object identifiers, the level of the link, and the like, and there is no limitation on the data structure. All pairs of two object identifiers are, for example, '(product A, product B) (product A, product C) (product A, product B) (product C, product D) . . . ', and a collection of information on pairs of object identifiers having a link relationship. In '(product A, product B) (product A, product C) (product A, product B) (product C, product D) . . . ', at least two pairs of (product A, product B) are present. Accordingly, it is seen that, in this example, the level of the link between 'product A' and 'product B' is two or more. If the link information has information on the level of the link, the link information is, for example, '(product A, product B, 2) (product A, product C, 1) (product C, product D, 5) . . . '. Here, (product A, product B, 2) indicates that the link between 'product A' and 'product B' is present and its level is '2'. The link information-generating portion 114 may be realized typically as an MPU, a memory, or the like. Typically, the processing procedure of the link information-generating portion 114 is realized using software, and the software is stored in a storage medium such as a ROM. Note that the processing procedure also may be realized using hardware (dedicated circuit). Here, the level of the link refers to the strength of the relationship between nodes.

The object identifier-accepting portion 115 accepts one object identifier. An accepting operation herein is typically a receiving operation. However, an accepting operation may be an operation of accepting input from a user. The object identifier-accepting portion 115 is realized typically as a wireless or wired communication unit, but also may be realized as a unit that receives a broadcast. The object identifier-accepting portion 115 preferably receives the one object identifier from the terminal apparatus 12. Here, the one object identifier refers to an identifier of an object on which the user of the terminal apparatus 12 has performed some sort of operation (e.g., purchase, bookmarking, focus movement, etc.).

The in-group object identifier-acquiring portion 116 acquires an object identifier having at least a predetermined level of relevance (the predetermined level is typically held in advance in a storage medium in the in-group object identifier-acquiring portion 116) with the one object identifier accepted by the object identifier-accepting portion 115, using the link information generated by the link information-generating portion 114. Here, the phrase 'at least a predetermined level of relevance' refers to, for example, a relationship in which linkage to one object identifier is established in a predetermined relationship, in a case where a unipartite graph using two or more object identifiers is formed by eliminating information (user identifiers, user attribute values, and input information described in Embodiment 2) other than the object identifiers from a bipartite graph formed using the object identifiers and the other information. For example, the in-group object identifier-acquiring portion 116 acquires an object identifier having at least a predetermined level of relevance with the one object identifier accepted by the object identifier-accepting portion 115, using the link information generated by the link information-generating portion 114. The in-group object identifier-acquiring portion 116 acquires an object identifier of an object belonging to the same group as an object identified with the one object identifier accepted by the object identifier-accepting portion 115, using the link information generated by the link information-generating portion 114, and arranges the object identifier in a memory. There is no limitation on the algorithm for acquiring an object identifier of an object belonging to a group.

For example, this sort of unipartite graph including the relationship between objects is referred to as a relationship network. Finding an object in the same group as a given object means dividing the graph so as to maximize the amount of some sort of aspect relating to the community structure of the objects in the relationship network. As an indicator of the same group forming an appropriate community structure, there is the concept of modularity.

For example, the in-group object identifier-acquiring portion 116 computes local modularity (R), following an algorithm using Equation 1 below. Then, based on the indicator (R), objects belonging to the same group are specified, and their object identifiers are acquired.

$$R = \frac{\sum_{ij} B_{ij}\delta(i, j)}{\sum_{ij} B_{ij}} = \frac{I}{T}$$ Equation 1

Figure 3:
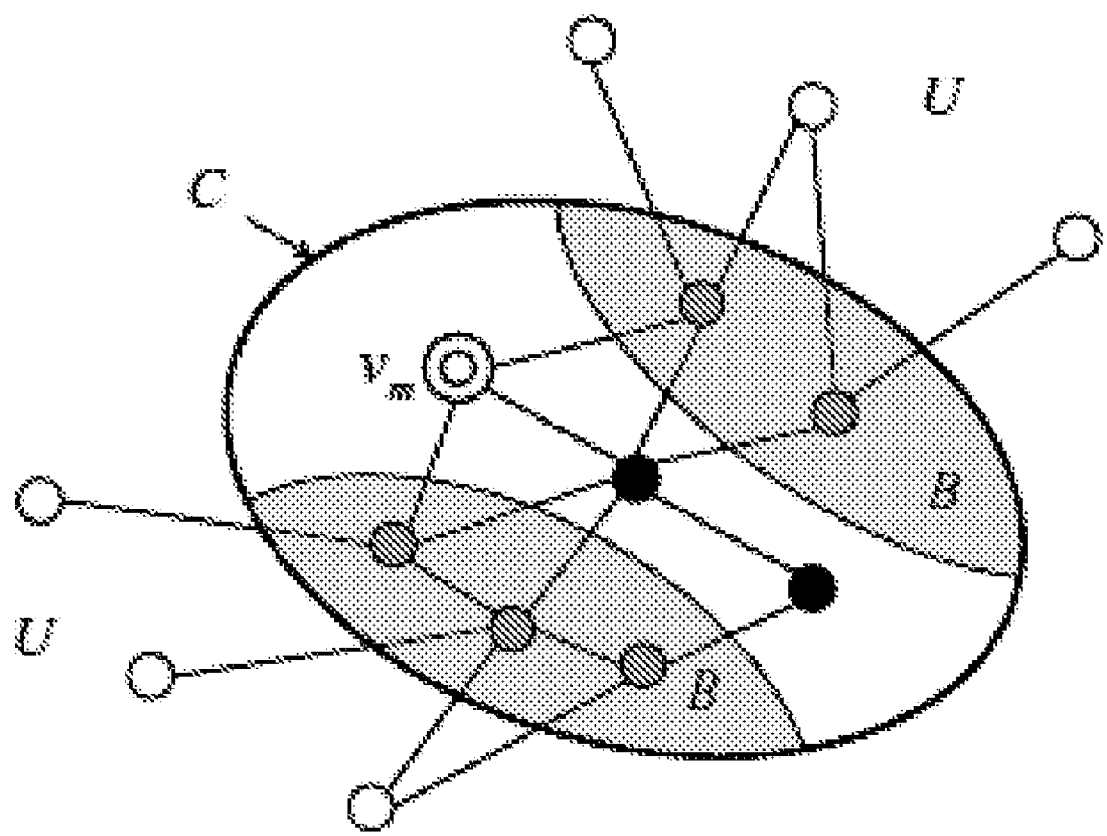
FIG. 3 is a conceptual diagram of a relationship network that is to be analyzed in this embodiment.

That is to say, in the relationship network that is to be analyzed (the above-mentioned unipartite graph), an origin node of interest is taken as $v_m$ (see FIG. 3). The origin node $v_m$ of interest is the one object identifier accepted by the object identifier-accepting portion 115. Furthermore, the origin node $v_m$ is an object identifier (network node) based on which a group of object identifiers is extracted. Here, the collection of nodes in an extracted group including the node $v_m$ and its surrounding nodes is taken as C. Furthermore, the collection of nodes that are not included in C and are positioned adjacent to at least one node of C is taken as U. Moreover, the collection of nodes that are in C and positioned adjacent to U is taken as B. At that time, the local modularity R of C is computed using Equation 1 above. In Equation 1, $B_{ij}$ is the weight of a link between nodes $v_i$ and $v_j$ in a case where the nodes $v_i$ and $v_j$ are linked and either one of them is included in B. If $v_i \in B$ and $v_j \in C$, or $v_i \in C$ and $v_j \in B$, $\delta(i, j)$ is 1. Otherwise, $\delta(i, j)$ is 0. That is to say, T is the total sum of the weights of all links of nodes included in B, and I is the total sum of the weights of links to nodes that are not in U among all links of B. If an operation of sequentially capturing adjacent nodes from the origin node $v_m$ of interest in C is repeated, C having the maximum value of R can be obtained as a group of the node $v_m$.

Furthermore, the in-group object identifier-acquiring portion 116 may acquire an object identifier using the second algorithm below. That is to say, the in-group object identifier-acquiring portion 116 may acquire an object identifier directly linked with the one object identifier accepted by the object identifier-accepting portion 115 at a link level that is equal to or larger than a threshold value (or that is larger than the threshold value).

Furthermore, the in-group object identifier-acquiring portion 116 may acquire an object identifier using the third algorithm below. That is to say, the in-group object identifier-acquiring portion 116 may acquire an object identifier directly linked with the one object identifier accepted by the object identifier-accepting portion 115 at a link level that is equal to or larger than a threshold value (or that is larger than the threshold value), and an object identifier directly linked with the directly linked object identifier at a link level that is equal to or larger than a threshold value (or that is larger than the threshold value).

Furthermore, the in-group object identifier-acquiring portion 116 may acquire an object identifier using the fourth algorithm below. That is to say, the in-group object identifier-acquiring portion 116 acquires an object identifier directly linked with the one object identifier accepted by the object identifier-accepting portion 115 at a link level that is equal to or larger than a threshold value (or that is larger than the threshold value), and an object identifier directly linked with the directly linked object identifier at a link level that is equal to or larger than a threshold value (or that is larger than the threshold value). Then, all object identifiers linked at a link level that is equal to or larger than a threshold value (or that is larger than the threshold value) are recursively obtained.

Furthermore, the in-group object identifier-acquiring portion 116 may acquire an object identifier using the fifth algorithm below. That is to say, the in-group object identifier-acquiring portion 116 may acquire all object identifiers directly linked with the one object identifier accepted by the object identifier-accepting portion 115, and an object identifier directly linked with each of the directly linked object identifiers at a link level that is equal to or larger than a threshold value (or that is larger than the threshold value).

Furthermore, the in-group object identifier-acquiring portion 116 may acquire an object identifier using the sixth algorithm below. That is to say, the in-group object identifier-acquiring portion 116 may acquire the first x object identifiers (x is a natural number of 1 or more) in descending order of link level in all object identifiers directly linked with the one object identifier accepted by the object identifier-accepting portion 115.

Furthermore, the in-group object identifier-acquiring portion 116 may acquire an object identifier using the seventh algorithm below. That is to say, the in-group object identifier-acquiring portion 116 may acquire the first x % of object identifiers (x is larger than 0 and smaller than 100) in descending order of link level in all object identifiers directly linked with the one object identifier accepted by the object identifier-accepting portion 115.

Moreover, the in-group object identifier-acquiring portion 116 may acquire an object identifier using the eighth algorithm below (this algorithm is referred to as a 'mutual significance-adding algorithm'). The mutual significance-adding algorithm is an algorithm for determining an object identifier in the group using a mutual significance-adding link level C that is obtained by computation in which the relative weight, viewed from a first object identifier, of a link with a second object identifier (link weight A) and the relative weight, viewed from the second object identifier, of a link with the first object identifier (link weight B) are used as parameters. Equations for computing the mutual significance-adding link level C are given, for example, as Equation 2.

Equation 2 shows an example of the equations for computing the mutual significance-adding link level C between the object ($v_m$) and the object ($v_a$). In Equation 2, 'sum of weights of all links of $v_m$' refers to the sum of the weights of links from $v_m$ to adjacent objects.

Link level $A$=weight of link between $v_m$ and $v_a$/sum of weights of all links of $v_m$ Link level $B$=weight of link between $v_m$ and $v_a$/sum of weights of all links of $v_a$ Mutual significance-adding link level $C$=link level $A$×link level $B$     Equation 2

The in-group object identifier-acquiring portion 116 may compute the mutual significance-adding link level for all object identifiers directly linked with one object identifier, and then may acquire the first x object identifiers (x is a natural number of 1 or more) or the first x % of object identifiers (x is larger than 0 and smaller than 100) in descending order of mutual significance-adding link level, or may acquire object identifiers in which the mutual significance-adding link level is equal to or larger than a threshold value.

Figure 4:
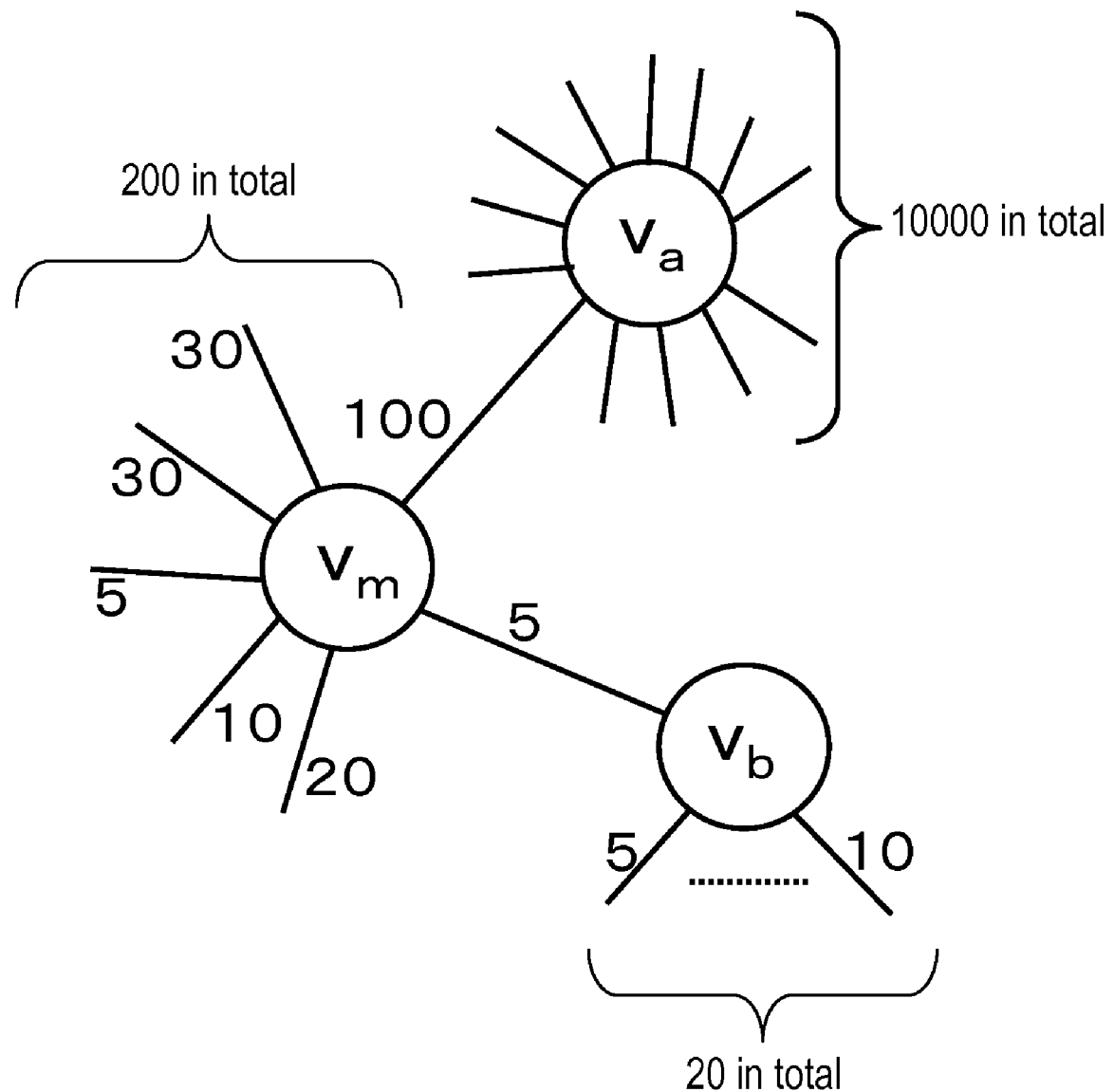
FIG. 4 is a diagram illustrating an algorithm for computing the mutual significance-adding link level in this embodiment.

Hereinafter, a specific example of a method for computing the mutual significance-adding link level will be described with reference to FIG. 4. In FIG. 4, the sum of the weights of all links of the object ($v_m$) is 200. The sum of the weights of all links of the object ($v_a$) is 10000. The sum of the weights of all links of the object ($v_b$) is 20. The weight of the link between $v_m$ and $v_a$ is 100. The weight of the link between $v_m$ and $v_b$ is 5.

The link level A between $v_m$ and $v_a$ is '100/200', and the link level B between $v_m$ and $v_a$ is '100/10000'. Thus, the mutual significance-adding link level C between $v_m$ and $v_a$ is '(100/200)×(100/10000)=1/200'.

Conversely, the link level A between $v_m$ and $v_b$ is '5/200', and the link level B between $v_m$ and $v_b$ is '5/20'. Thus, the mutual significance-adding link level C between $v_m$ and $v_b$ is '(5/200)×(5/20)=1/160'.

That is to say, in view of the object ($v_m$), the mutual significance-adding link level C with the object ($v_b$) is larger than that with the object ($v_a$). Accordingly, in view of the object ($v_m$), the object ($v_b$) is more likely to be selected as an object in the group.

In addition to the above, there are various algorithms following which the in-group object identifier-acquiring portion 116 acquires an object identifier belonging to the same group as the one object identifier accepted by the object identifier-accepting portion 115.

The in-group object identifier-acquiring portion 116 may be realized typically as an MPU, a memory, or the like. Typically, the processing procedure of the in-group object identifier-acquiring portion 116 is realized using software, and the software is stored in a storage medium such as a ROM. Note that the processing procedure also may be realized using hardware (dedicated circuit).

The in-group object information output portion 117 outputs object information, which is the object identifier acquired by the in-group object identifier-acquiring portion 116 or information related to an object identified with the object identifier. The in-group object information output portion 117 has, for example, an object information storage unit (not shown) in which object information paired with an object identifier is stored. The in-group object information output portion 117 reads the object information paired with the object identifier acquired by the in-group object identifier-acquiring portion 116 from the object information storage unit, and outputs the object information. Here, the object information refers to names, specifications, prices, image data, or the like of an object (e.g., a product). Furthermore, the object information also may be an object identifier. The in-group object information output portion 117 transmits object information, which is the object identifier acquired by the in-group object identifier-acquiring portion 116 or information related to an object identified with the object identifier, to the terminal apparatus 12. Here, the output typically refers to transmission to an external apparatus (the terminal apparatus 12, etc.), but also has a concept that includes display on a display screen, projection using a projector, printing in a printer, outputting a sound, accumulation in a storage medium, delivery of a processing result to another processing apparatus or another program, and the like. The in-group object information output portion 117 is realized typically as a wireless or wired communication unit, but also may be realized as a broadcasting unit.

The input-accepting portion 121 accepts input from a user. The input is, for example, an instruction to purchase a product, an instruction to browse product information (an instruction to browse a webpage), an instruction to provide a mark to bookmark product information, input of input information such as a keyword or a color described later, or the like. Furthermore, the input also includes the input of various types of information or data. As the input unit of this sort of instruction, information, or the like, any unit may be used such as a keyboard, a mouse, and a menu screen. The input-accepting portion 121 may be realized as a device driver for an input unit such as a keyboard, or control software for a menu screen, for example.

The information-transmitting portion 122 transmits the instruction, information, or the like accepted by the input-accepting portion 121, to the information-processing apparatus 11. The information-transmitting portion 122 is realized typically as a wireless or wired communication unit, but also may be realized as a broadcasting unit.

The information-receiving portion 123 receives information from the information-processing apparatus 11 or other apparatuses. Here, various types of information may be received. The information-receiving portion 123 is realized typically as a wireless or wired communication unit, but also may be realized as a unit that receives a broadcast.

The information output portion 124 outputs the information received by the information-receiving portion 123. Here, the output has a concept that includes display on a display screen, projection using a projector, printing in a printer, outputting a sound, transmission to an external apparatus, accumulation in a storage medium, delivery of a processing result to another processing apparatus or another program, and the like. The information output portion 124 may be considered to include or not to include an output device such as a display screen or a printer. The information output portion 124 may be realized as driver software for an output device, or a combination of driver software for an output device and the output device.

Next, the operation of the information-processing system will be described. First, the operation of the information-processing apparatus 11 will be described with reference to the flowcharts in FIGS. 5 to 8.

(step S501) The operation information-accepting portion 112 judges whether or not operation information has been accepted. If operation information has been accepted, the procedure proceeds to step S502. If operation information has not been accepted, the procedure proceeds to step S503.

(step S502) The operation information-accumulating portion 113 accumulates the operation information accepted in step S501, in the operation information storage portion 111. The procedure returns to step S501.

(step S503) The object identifier-accepting portion 115 judges whether or not an object identifier has been accepted. If an object identifier has been accepted, the procedure proceeds to step S504. If an object identifier has not been accepted, the procedure returns to step S501. Herein, the object identifier-accepting portion 115 typically receives an object identifier from the terminal apparatus 12.

(step S504) The link information-generating portion 114 performs a link information-generating process using the object identifier accepted in step S503. The link information-generating process refers to a process of generating link information and writing it at least temporarily in a storage medium. The link information-generating process will be described with reference to the flowchart in FIG. 6.

(step S505) The in-group object identifier-acquiring portion 116 performs an in-group object identifier-acquiring process using the link information generated in step S504. The in-group object identifier-acquiring process refers to a process of acquiring one or more object identifiers belonging to the same group as the object identifier accepted in step S503. Here, the object identifier belonging to the same group as the object identifier accepted in step S503 also may be 0. The in-group object identifier-acquiring process will be described with reference to the flowchart in FIG. 8.

(step S506) The in-group object information output portion 117 constructs object information using the object identifier acquired in step S505. The object information refers to one or more pieces of information on names, specifications, prices, image data, object identifiers and the like of an object (e.g., a product).

(step S507) The in-group object information output portion 117 outputs the object information constructed in step S506. Here, the output typically refers to transmission of the object information to the terminal apparatus 12 that transmitted the object identifier accepted in step S503. The procedure returns to step S501.

Figure 5:
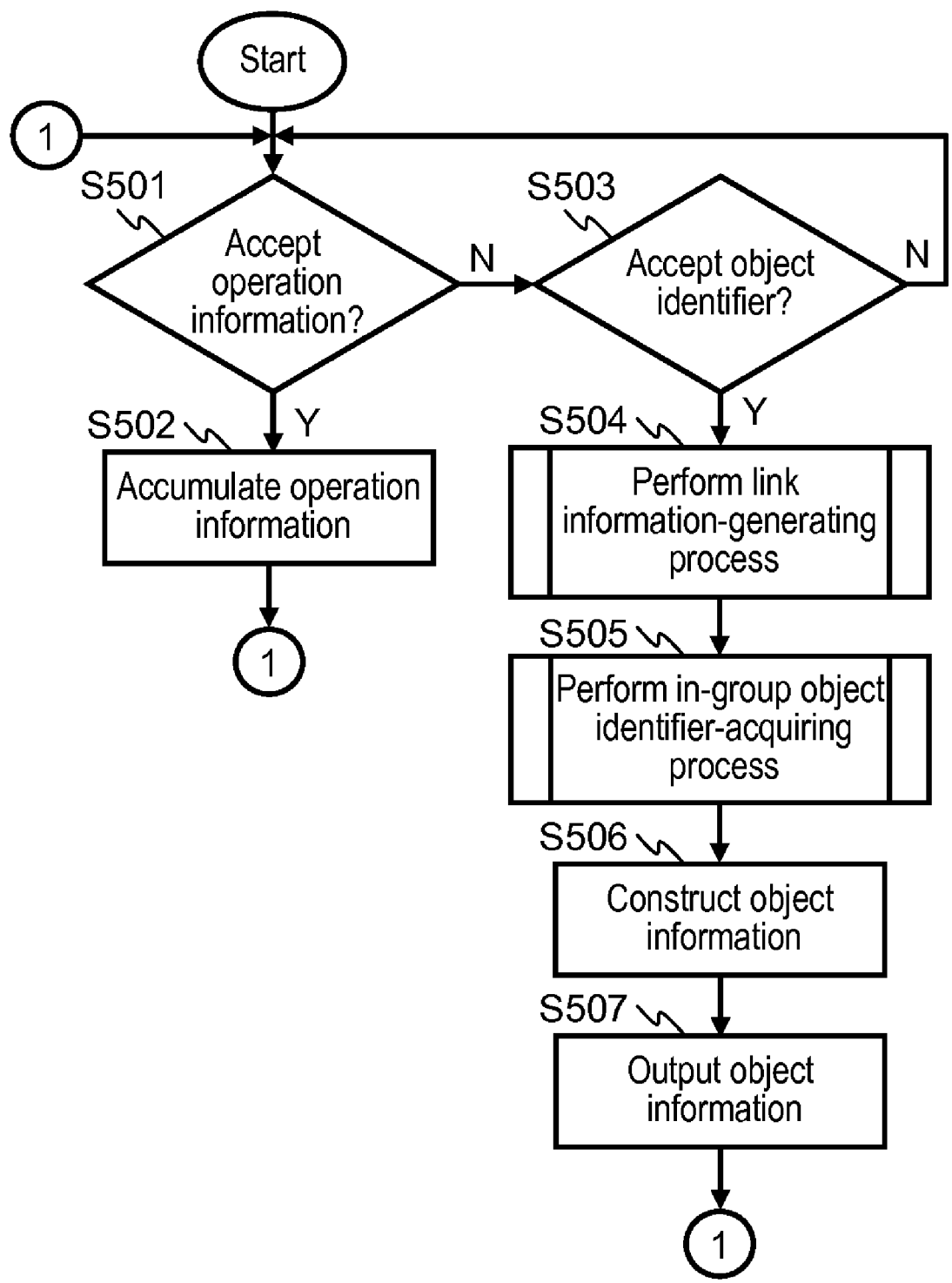
FIG. 5 is a flowchart illustrating the operation of the information-processing apparatus in this embodiment.

Here, in the flowchart in FIG. 5, the link information-generating process in step S504 may have been performed in advance, and the link information may have been stored in advance in a storage medium (not shown).

Furthermore, in the flowchart in FIG. 5, the in-group object identifier-acquiring process in step S505 may have been performed in advance, and the in-group object identifiers (one or more object identifiers) corresponding to each object identifier may have been stored in advance in a storage medium (not shown).

Note that the process is terminated by powering off or an interruption to abort the process in the flowchart in FIG. 5.

Next, the link information-generating process in step S504 will be described with reference to the flowcharts in FIGS. 6 and 7.

(step S601) The link information-generating portion 114 substitutes 1 for a counter i.

(step S602) The link information-generating portion 114 judges whether or not the ith user identifier is present. If the ith user identifier is present, the procedure proceeds to step S603. If the ith user identifier is not present, the procedure proceeds to step S613. Here, the link information-generating portion 114 searches the operation information in the operation information storage portion 111 or a user identifier group management table stored in another unit (not shown), and judges whether or not the ith user identifier is present. Furthermore, the ith user identifier (i is 1, 2, . . . ) refers to a unique user identifier.

(step S603) The link information-generating portion 114 substitutes 1 for a counter j.

(step S604) The link information-generating portion 114 judges whether or not the jth object identifier is present. If the jth object identifier is present, the procedure proceeds to step S605. If the jth object identifier is not present, the procedure proceeds to step S612.

(step S605) The link information-generating portion 114 substitutes 'j+1' for a counter k.

(step S606) The link information-generating portion 114 judges whether or not the kth object identifier is present. If the kth object identifier is present, the procedure proceeds to step S607. If the kth object identifier is not present, the procedure proceeds to step S611.

(step S607) The link information-generating portion 114 reads all pieces of operation information containing the ith user identifier from the operation information storage portion 111.

(step S608) The link information-generating portion 114 judges whether or not both of the jth object identifier and the kth object identifier are present in the operation information read in step S607. If both of the object identifiers are present, the procedure proceeds to step S609. If both of the object identifiers are not present, the procedure proceeds to step S610.

(step S609) The link information-generating portion 114 writes (jth object identifier, kth object identifier) to a buffer.

(step S610) The link information-generating portion 114 incrementally increases the counter k by 1. The procedure returns to step S606.

(step S611) The link information-generating portion 114 incrementally increases the counter j by 1. The procedure returns to step S604.

(step S612) The link information-generating portion 114 incrementally increases the counter i by 1. The procedure returns to step S602.

(step S613) The link information-generating portion 114 constructs link information using the information written in the buffer in step S609. The procedure returns to the upper-level processing. The link information-constructing process will be described with reference to the flowchart in FIG. 7.

Figure 6:
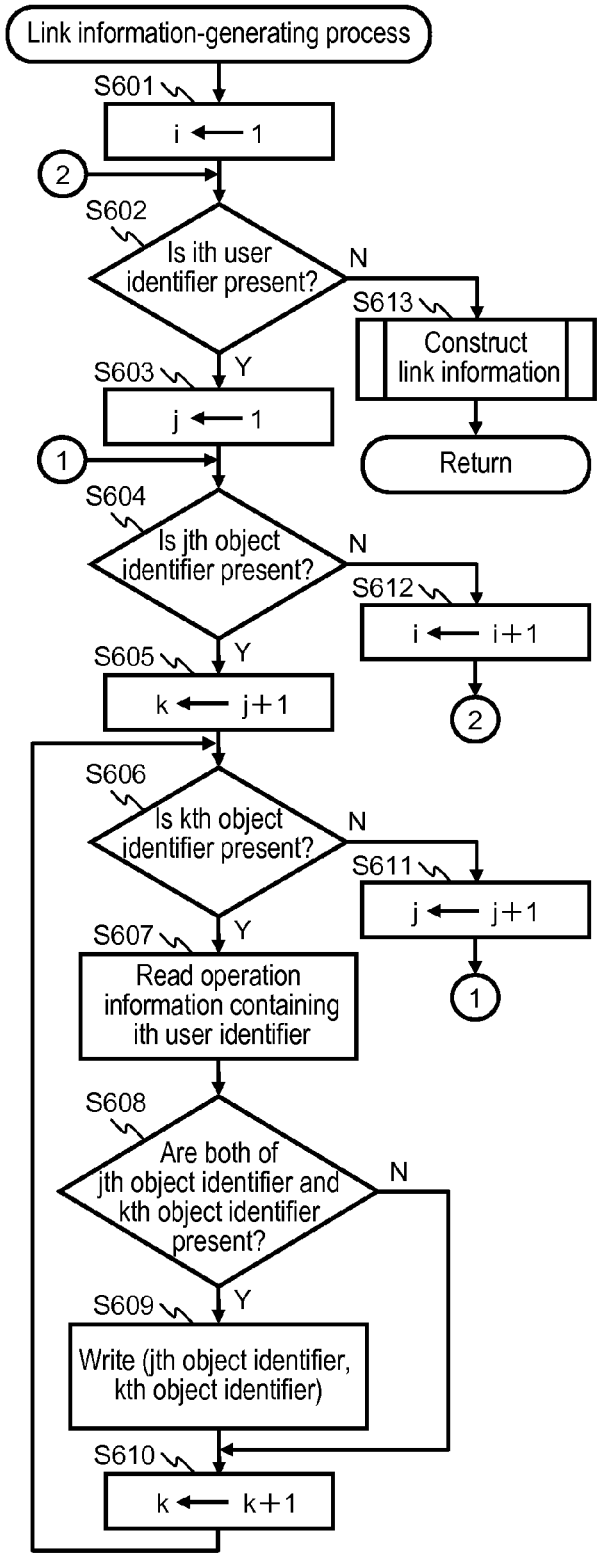
FIG. 6 is a flowchart illustrating a link information-generating process in this embodiment.
Figure 7:
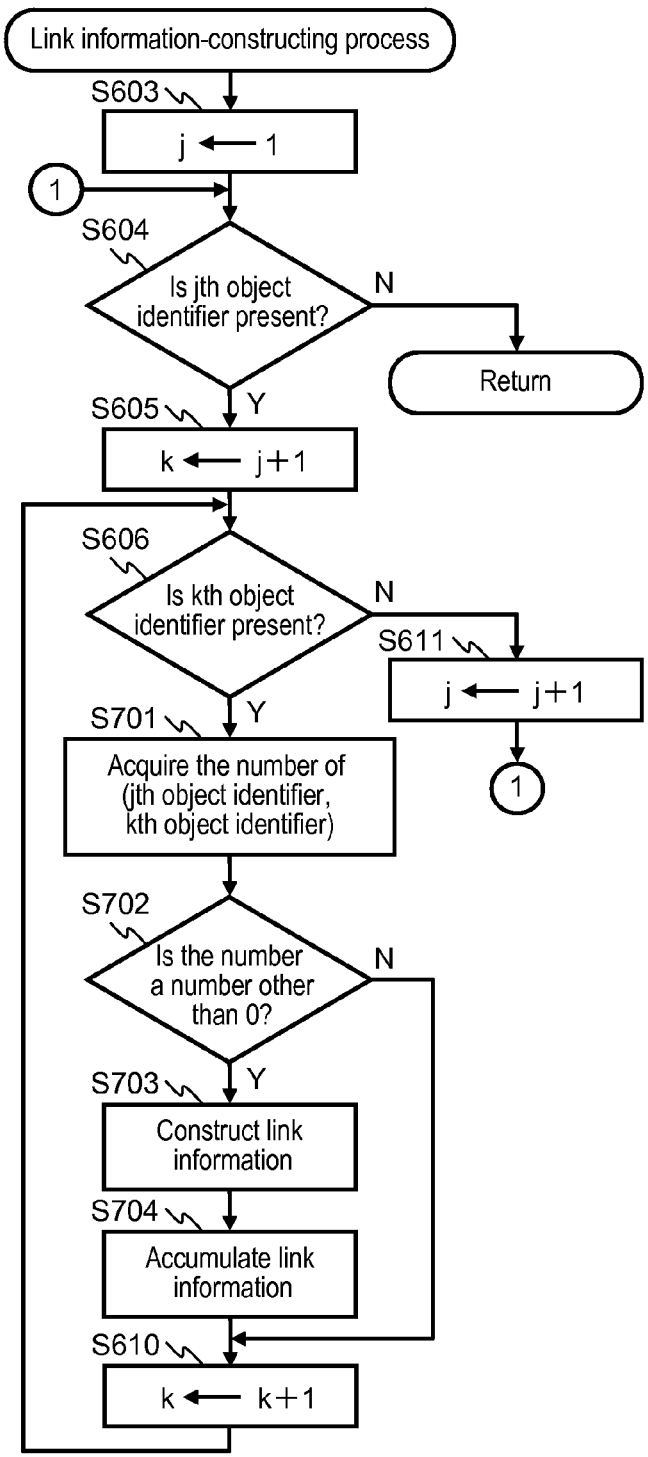
FIG. 7 is a flowchart illustrating a link information-constructing process in this embodiment.

Here, in the flowchart in FIG. 6, there is no limitation on the structure of data written in step S609.

Next, the link information-constructing process in step S613 will be described with reference to the flowchart in FIG. 7. In the flowchart in FIG. 7, a description of the same steps as those in the flowchart in FIG. 6 has been omitted.

(step S701) The link information-generating portion 114 acquires the number of pieces of data '(jth object identifier, kth object identifier)' written in the buffer in step S609, and arranges the information in the memory.

(step S702) The link information-generating portion 114 judges whether or not the number acquired in step S701 is a number other than 0. If the number is a number other than 0, the procedure proceeds to step S703. If the number is 0, the procedure proceeds to step S610.

(step S703) The link information-generating portion 114 constructs link information using the data '(jth object identifier, kth object identifier)' and the number acquired in step S701. The link information is, for example, (jth object identifier, kth object identifier, the number acquired in step S701).

(step S704) The link information-generating portion 114 accumulates the link information constructed in step S703 in a storage medium (not shown). This storage medium may be a non-volatile storage medium, or may be a volatile storage medium.

Next, the in-group object identifier-acquiring process in step S505 will be described with reference to the flowchart in FIG. 8.

Figure 8:
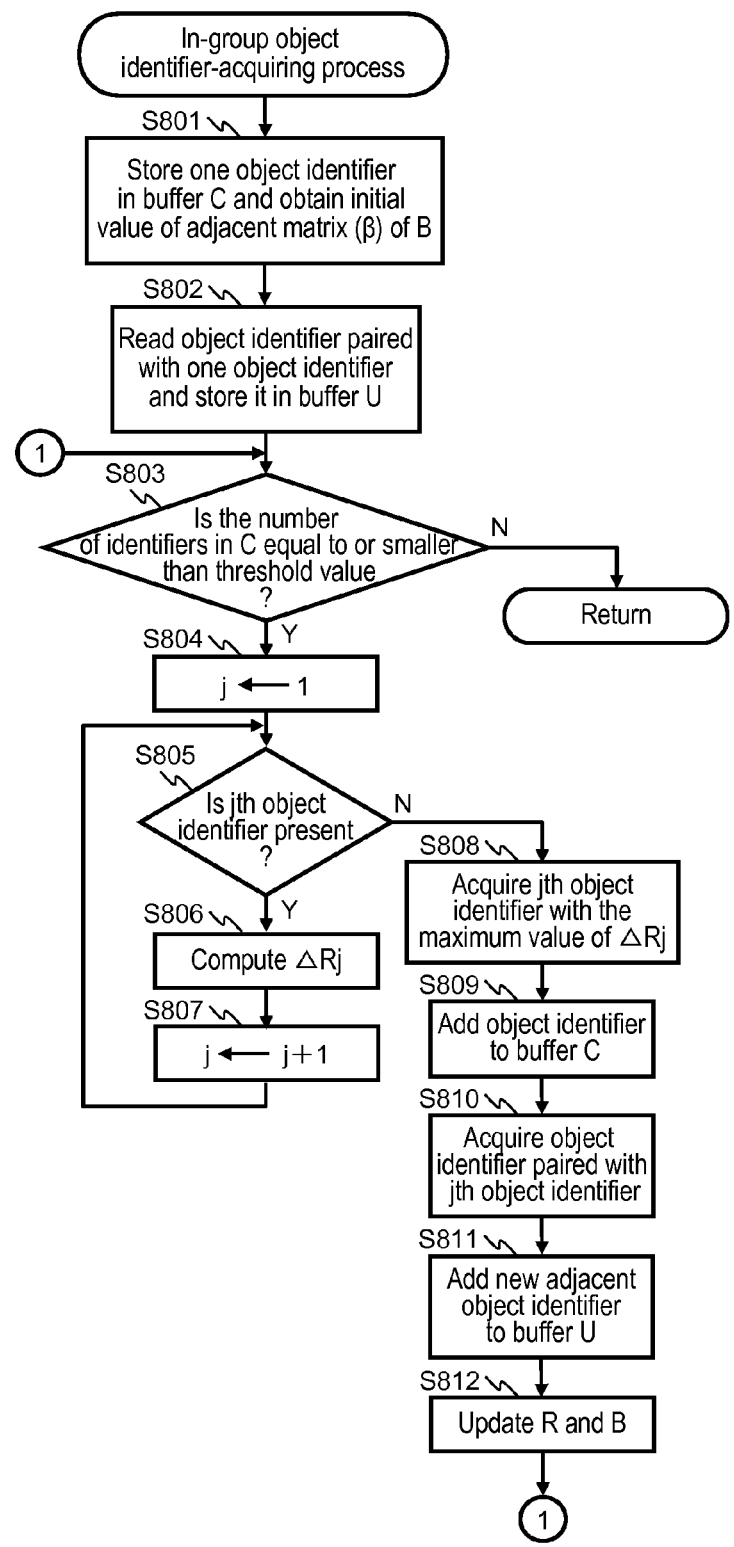
FIG. 8 is a flowchart illustrating an in-group object identifier-acquiring process in this embodiment.

Here, the settings in the flowchart in FIG. 8 are as follows. In the relationship network that is to be analyzed (the above-mentioned unipartite graph), an origin node of interest is taken as $v_m$ (see FIG. 3). The origin node $v_m$ of interest is the one object identifier accepted by the object identifier-accepting portion 115. Furthermore, the origin node $v_m$ is an object identifier (network node) based on which a group of object identifiers is extracted. Here, the collection of nodes in an extracted group including the node $v_m$ and its surrounding nodes is taken as C. Furthermore, the collection of nodes that are not included in C and are positioned adjacent to at least one node of C is taken as U. Moreover, the collection of nodes that are in C and positioned adjacent to U is taken as B.

(step S801) The in-group object identifier-acquiring portion 116 stores the one object identifier in a buffer C, obtains the initial value of an adjacent matrix ($\beta$) of B, and arranges the initial value in the memory.

(step S802) The in-group object identifier-acquiring portion 116 reads an object identifier paired with the one object identifier from the link information, and stores the object identifier in a buffer U.

(step S803) The in-group object identifier-acquiring portion 116 judges whether or not the number of object identifiers in the buffer C is equal to or smaller than a threshold value. The threshold value herein is stored in advance. 'Judgment deciding whether or not the number is equal to or smaller than a threshold value' may be 'judgment deciding whether or not the number is smaller than the threshold value'. If the number is equal to or smaller than a threshold value, the procedure proceeds to step S804. If the number is not equal to or smaller than a threshold value, the procedure returns to the upper-level processing.

(step S804) The in-group object identifier-acquiring portion 116 substitutes 1 for a counter j.

(step S805) The in-group object identifier-acquiring portion 116 judges whether or not the jth object identifier is present in the buffer U. If the jth object identifier is present, the procedure proceeds to step S806. If not, the procedure proceeds to step S809.

(step S806) The in-group object identifier-acquiring portion 116 executes Equation 3, below, to obtain $\Delta R_j$, and arranges it in the memory.

$$\Delta R_j = \frac{x - Ry - z(1-R)}{T - z + y} \qquad \text{Equation 3}$$

In Equation 3 above, x, y, and z are as follows. That is to say, 'x' refers to the total sum of the weights of all the links of $v_j$ to B, 'y' refers to the total sum of the weights of the links added to T in the case where $v_j$ is selected for C, and 'z' refers to the total sum of the weights of the links subtracted from T in the case where $v_j$ is selected for C. Equation 3 is an equation that has the same concept as Equation 1, and is a simplified equation with which the amount of calculation is small.

(step S807) The in-group object identifier-acquiring portion 116 incrementally increases the counter j by 1. The procedure returns to step S805.

(step S808) The in-group object identifier-acquiring portion 116 acquires the jth object identifier with the maximum value of $\Delta R_j$.

(step S809) The in-group object identifier-acquiring portion 116 adds the object identifier acquired in step S808 to the buffer C.

(step S810) The in-group object identifier-acquiring portion 116 acquires an object identifier paired with the object identifier acquired in step S808.

(step S811) The in-group object identifier-acquiring portion 116 adds a new adjacent object identifier to the buffer U.

(step S812) The in-group object identifier-acquiring portion 116 updates R and B. The procedure returns to step S803. Here, an update of B leads to an update of $\beta$.

Here, as described above, the in-group object identifier-acquiring process is not limited to the process in the flowchart in FIG. 8.

Next, the operation of the terminal apparatus 12 will be described. The input-accepting portion 121 of the terminal apparatus 12 accepts the input of information such as the operation information or the object identifier from a user. For example, the input-accepting portion 121 accepts operation information (e.g., 'user A, product 1') containing an instruction to purchase a given product, from a user. Furthermore, if a user A considers purchasing a product and browses product information on a product 2, the input-accepting portion 121 accepts the object identifier 'product 2'.

Next, the information-transmitting portion 122 transmits information such as the operation information or the object identifier accepted by the input-accepting portion 121, to the information-processing apparatus 11.

Next, the information-receiving portion 123 receives information from the information-processing apparatus 11 or other apparatuses. The information is, for example, object information, which is information related to an object identifier belonging to the same group as the object identifier 'product 2'. This sort of object information is information on a product or the like recommended for the user A. Then, the information output portion 124 outputs the information received by the information-receiving portion 123.

Hereinafter, a specific operation of the information-processing system 1 in this embodiment will be described. FIG. 1 is a conceptual diagram of the information-processing system.

Figure 9:
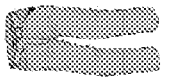
FIG. 9 is a diagram showing an object management table in this embodiment.
Figure 9:
Figure 9:
Figure 9:
Figure 9:
Figure 9:

It is assumed that the object management table shown in FIG. 9 is held in a server apparatus (not shown) or the information-processing apparatus 11. It is assumed that, if the object management table is held in the server apparatus, the server apparatus is connected to a network. The object management table is a table for managing objects. Here, the objects are products, in particular, articles that are to be put on a body, such as clothes and shoes. The object management table is a table in which one or more object records, which are pieces of information on a product or service for an electronic commercial transaction, are stored. The object management table has 'ID', 'object identifier', and 'object'. Here, 'ID' is information for identifying records in the table, and is for managing the table. 'Object identifier' is information for identifying objects, and is an object ID in this example. Here, 'object identifier' may be, for example, a name of a product, or may be information containing an object attribute described later. In 'object', one or more attribute values of an object are stored. The attribute value refers to 'product name', 'product type', 'size', or the like. 'Product type' refers to the type of a product.

Figure 10:
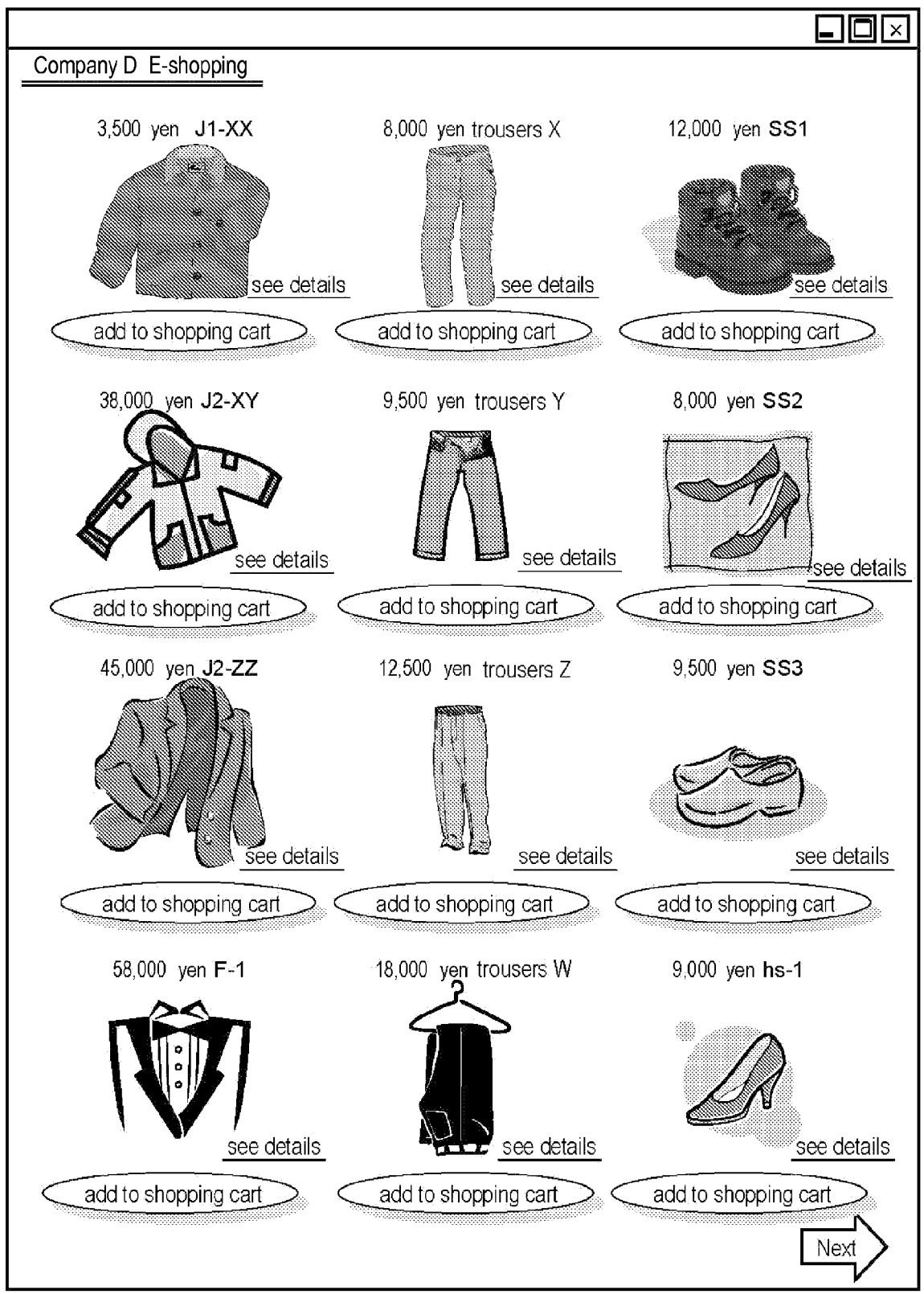
FIG. 10 is a view showing a screen example of a website in this embodiment.

It is assumed that the user A of the terminal apparatus 12 accesses an apparatus in which the object management table is held (hereinafter, this apparatus is taken as the information-processing apparatus 11) and logs into a site for an electronic commercial transaction (an E-shopping site of company D). For example, it is assumed that the terminal apparatus 12 receives the website for an electronic commercial transaction from the information-processing apparatus 11, executes the script of the website, and displays a screen as shown in FIG. 10. The process of displaying such a website is a so-called web browser process, and is well known. Thus, a detailed description thereof has been omitted. Here, it is assumed that the user A inputs the user identifier 'A' when logging into the site for an electronic commercial transaction.

Next, it is assumed that the user has performed an operation in which a product (e.g., a product with the object identifier '1') that the user wants is added to the shopping cart (an 'add to shopping cart' button is pressed) so as to be purchased (e.g., a purchase button (not shown) is pressed), while viewing a screen in FIG. 10. Subsequently, the input-accepting portion 121 accepts the user identifier 'A' and the object identifier '1'. Then, the information-transmitting portion 122 constructs the information 'user identifier: A, object identifier: 1', and transmits the information to the information-processing apparatus 11. Here, the information 'user identifier: A, object identifier: 1' is an example of the above-described operation information, and indicates that the user A purchases a product identified with the object identifier '1'.

The operation information-accepting portion 112 of the information-processing apparatus 11 receives the operation information 'user identifier: A, object identifier: 1'. Then, the operation information-accumulating portion 113 acquires the time at which the information was received from a clock (not shown), and changes the information into information having the structure of 'user identifier, object identifier, time information'. Then, the operation information-accumulating portion 113 accumulates the changed operation information in the operation information storage portion 111.

Furthermore, it is assumed that users such as a user B and a user C that are not the user A also have performed a product purchase operation as described above. It is assumed that the operation information-accumulating portion 113 of the information-processing apparatus 11 has accumulated the operation information in the operation information storage portion 111 as in the above-described process. Then, it is assumed that the operation information management table shown in FIG. 11 has been accumulated in the operation information storage portion 111. In the operation information management table herein, operation information, which is information indicating a purchase history of previously purchased products and the like, is stored. That is to say, the operation information herein is information indicating that the user has performed an operation of purchasing a product or the like, and has a user identifier, an object identifier, and time period information. In the operation information management table, one or more records having 'ID' and 'operation information' are stored. 'Operation information' has 'user identifier', 'object identifier', and 'time period information'.

Figure 12:
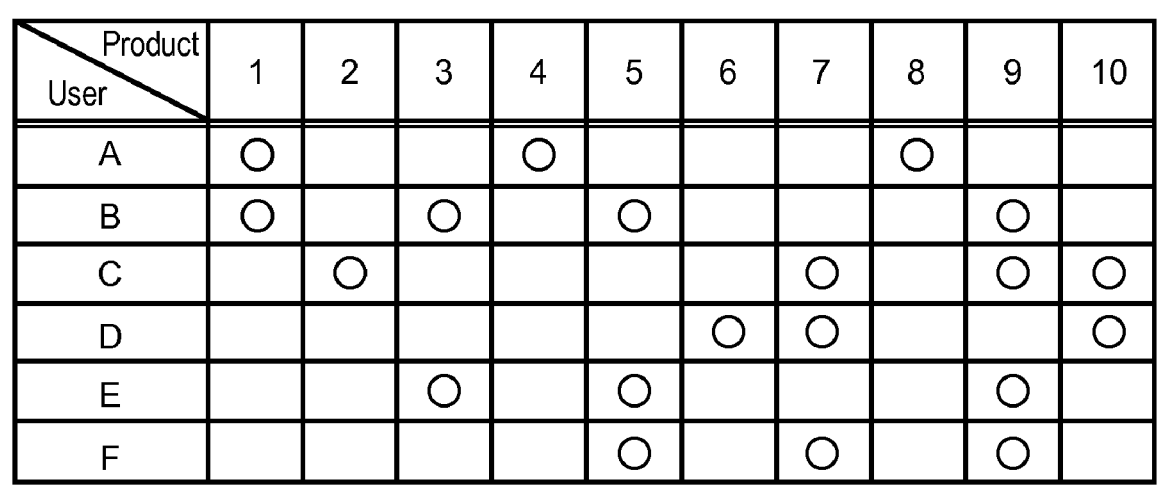

Furthermore, from the operation information management table shown in FIG. 11, it is seen that users (e.g., the users A to F) purchased products (e.g., any of the products 1 to 10) provided with a circle shown in FIG. 12.

Then, the link information-generating portion 114 performs the link information-generating process as follows based on the information in FIG. 12. That is to say, the link information-generating portion 114 obtains the first user identifier 'A', following the operation in the flowcharts in FIGS. 6 and 7. Next, the link information-generating portion 114 reads all pieces of operation information containing the first user identifier 'A' from the operation information storage portion 111. Then, the link information-generating portion 114 obtains the operation information '(A, 1) (A, 4) (A, 8)'. Here, in this operation information, the time information is excluded. The link information-generating portion 114 extracts the object identifiers '1', '4', and '8' from the operation information '(A, 1) (A, 4) (A, 8)', and obtains '(1, 4) (1, 8) (4, 8)' representing all combinations of two object identifiers. Then, the link information-generating portion 114 writes the pairs of two object identifiers '(1, 4) (1, 8) (4, 8)' to a buffer.

Next, the link information-generating portion 114 obtains the second user identifier 'B'. Then, the link information-generating portion 114 reads all pieces of operation information containing the second user identifier from the operation information storage portion 111. Then, the link information-generating portion 114 obtains the operation information '(B, 1) (B, 3) (B, 5) (B, 9)'. Next, the link information-generating portion 114 obtains the object identifier pairs '(1, 3) (1, 5) (1, 9) (3, 5) (3, 9) (5, 9)' from the operation information '(B, 1) (B, 3) (B, 5) (B, 9)'. Then, the link information-generating portion 114 adds the object identifier pairs '(1, 3) (1, 5) (1, 9) (3, 5) (3, 9) (5, 9)' to the buffer. The link information-generating portion 114 performs this sort of processing also for the third and following user identifiers 'C', 'D', '☐', and 'F'. Then, the link information-generating portion 114 obtains the data group shown in FIG. 13. Data constituting the data group in FIG. 13 has the structure of (jth object identifier, kth object identifier).

Next, the link information-generating portion 114 puts the same pairs (jth object identifier, kth object identifier) together, and obtains the link information group in FIG. 14. The link information herein is (jth object identifier, kth object identifier, the number). Here, 'the number' refers to the number of pairs (jth object identifier, kth object identifier), and refers to the level of the link between 'the jth object identifier' and 'the kth object identifier'. Then, the link information-generating portion 114 accumulates the link information group in FIG. 14 in the storage medium. This storage medium may be a volatile storage medium, or may be a non-volatile storage medium.

Figure 15:
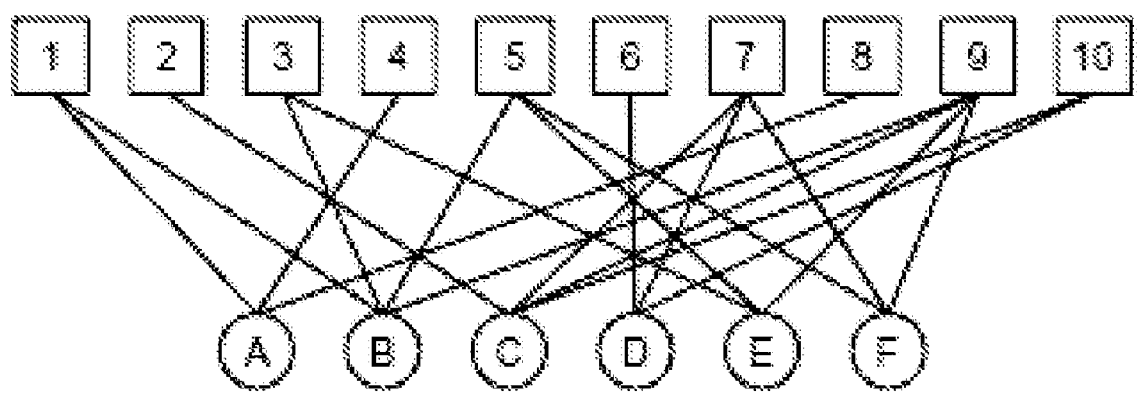
FIG. 15 is a conceptual diagram of a bipartite graph in this embodiment.
Figure 16:
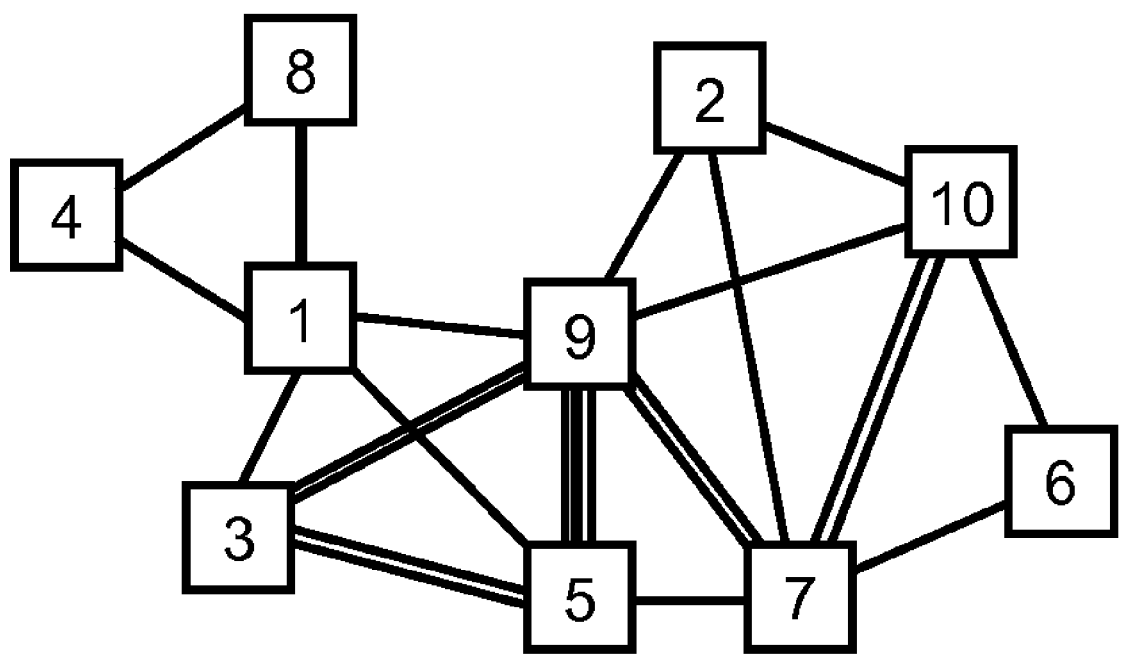
FIG. 16 is a conceptual diagram of a unipartite graph in this embodiment.

The process in which the link information-generating portion 114 acquires the data group in FIG. 13, and then acquires the link information group in FIG. 14, is a process that forms the unipartite graph in FIG. 16 based on the bipartite graph in FIG. 15. The bipartite graph in FIG. 15 is a graph in which user identifiers and object identifiers exist as nodes. The unipartite graph in FIG. 16 is a graph in which object identifiers exist as nodes.

The unipartite graph in FIG. 16 is a graph formed by linking object identifiers linked via the same user identifier in the bipartite graph in FIG. 15 and eliminating the user identifier.

For example, it is assumed that, in this status, the user A has used the terminal apparatus 12 to access the website of company D, and added the product 7 to the shopping cart (pressed the 'add to shopping cart' button). Then, the input-accepting portion 121 accepts information to the effect that the product 7 has been added to the shopping cart. Then, the information-transmitting portion 122 constructs the information 'user identifier: A, object identifier: 7', and transmits the information to the information-processing apparatus 11.

Figure 17:
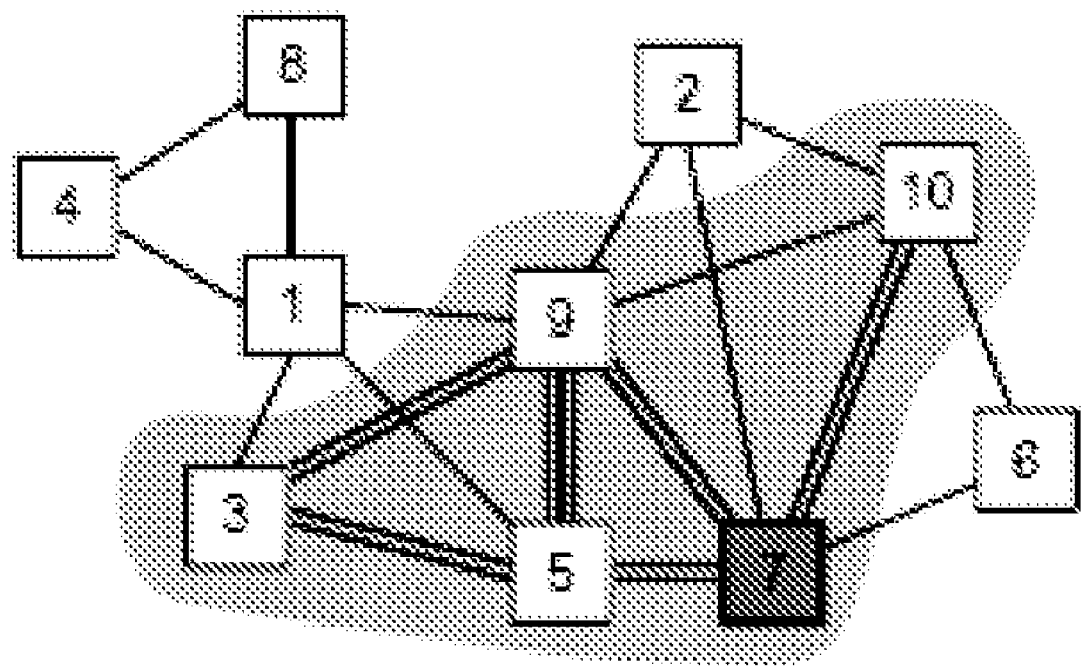
FIG. 17 is a schematic diagram showing an object identifier group in this embodiment.

Next, the object identifier-accepting portion 115 receives the information containing the object identifier '7'. Then, the in-group object identifier-acquiring portion 116 acquires an object identifier group in the group as follows. For example, the in-group object identifier-acquiring portion 116 acquires all nodes (object identifiers) directly linked from the object identifier '7' at a link level of '2' or higher, using the above-described algorithm. Then, the in-group object identifier-acquiring portion 116 obtains '5', '9', and '10'. Next, the object identifier '3' linked with the object identifier '5', '9', or '10' at a link level of '2' or higher is acquired. As a result, the in-group object identifier-acquiring portion 116 acquires the object identifiers '3', '5', '9', and '10', and arranges them in the memory. FIG. 17 is a schematic diagram showing an object identifier group belonging to the same group as the object identifier '7' acquired by the in-group object identifier-acquiring portion 116.

The in-group object information output portion 117 uses the object identifiers '3', '5', '9', and '10', to acquire object information, which is information related to an object identified with the object identifier. First, the in-group object information output portion 117 judges whether or not an object identifier of the object purchased by the user A is present among the object identifiers '3', '5', '9', and '10'. Here, the in-group object information output portion 117 searches the operation information management table in FIG. 11 using the user identifier 'A' as a key, and acquires an object identifier. Then, the in-group object information output portion 117 performs a process of eliminating the acquired object identifier from the object identifiers '3', '5', '9', and '10'. Herein, there is no object identifier that is to be eliminated, and the in-group object information output portion 117 holds the object identifiers '3', '5', '9', and '10' as they are.

Next, the in-group object information output portion 117 reads object information (e.g., 'product name', 'price', 'image', etc.) from the object management table in FIG. 9, using each of the object identifiers '3', '5', '9', and '10' as a key.

Next, the in-group object information output portion 117 transmits the read object information ('product name', 'price', 'image', etc. corresponding to the object identifiers '3', '5', '9', and '10') to the terminal apparatus 12.

Next, the information-receiving portion 123 of the terminal apparatus 12 receives the object information ('product name', 'price', 'image', etc. corresponding to the object identifiers '3', '5', '9', and '10'). Next, the information output portion 124 outputs the received object information on a display screen. Here, this object information is information on a product recommended for the user A. Furthermore, the object information is information on a product group having a certain relationship with the product 7 added to the shopping cart by the user A. There is no limitation on the manner in which the object information is output. Here, the product group may contain one or multiple products.

As described above, according to this embodiment, the precision in recommending products and the like can be improved. More specifically, according to this embodiment, a search of information on products and the like can be performed with good serendipity. Here, 'serendipity' is a term originally referring to an ability or capacity to find something of value when looking for something else, and is considered to be an important ability for a next generation recommendation system.

Here, according to this embodiment, products and the like were recommended using a method in which object information is output. However, products and the like may be recommended using other methods.

Furthermore, according to this embodiment, products and the like were recommended using, as a trigger, an event that the user has added a product to the shopping cart. However, products and the like may be recommended using, as a trigger, an event that the user has purchased a product or the like or an event that the user has moved the focus to a product or the like.

Furthermore, in this embodiment, a graph (information constituting a graph) was formed by linking object identifiers linked via the same user identifier and eliminating the user identifier. Then, an object identifier having at least a predetermined level of relevance with one object identifier was acquired from the graph and output. However, a graph also may be formed in which user identifiers linked via the same object identifier are linked and the user identifiers exist as nodes. In this case, the information-processing apparatus 11 is an information-processing apparatus, comprising: the operation information storage portion 111; a link information-generating portion that reads at least two pieces of operation information from the operation information storage portion 111, detects at least two user identifiers linked via an object identifier contained in the at least two pieces of operation information, and generates link information, which is information indicating a link relationship between at least two users and is information indicating the level of the link between the at least two users; a user identifier-accepting portion that accepts one user identifier; an in-group user identifier-acquiring portion that acquires a user identifier having at least a predetermined level of relevance with the one user identifier accepted by the user identifier-accepting portion, using the link information generated by the link information-generating portion; and an in-group user information output portion that outputs user information, which is information related to a user identifier acquired by the in-group user identifier-acquiring portion or a user identified with the user identifier. This information-processing apparatus constructs a 'user base network' based on a graph in which user identifiers exist as nodes. The same is applied to other embodiments.

The process in this embodiment may be realized using software. The software may be distributed by software download or the like. The software may be distributed in a form where the software is stored in a storage medium such as a CD-ROM. Note that the same is applied to other embodiments described in this specification. The software that realizes the information-processing apparatus in this embodiment may be the following program. Specifically, this program is a program for causing a computer to function as: a link information-generating portion that reads at least two pieces of operation information having a user identifier for identifying a user and an object identifier for identifying an object on which the user has performed an operation, detects at least two object identifiers linked via a user identifier contained in the at least two pieces of operation information, and generates link information, which is information indicating a link relationship between at least two objects and is information indicating the level of the link between the at least two objects; an object identifier-accepting portion that accepts one object identifier; an in-group object identifier-acquiring portion that acquires an object identifier having at least a predetermined level of relevance with the one object identifier accepted by the object identifier-accepting portion, using the link information generated by the link information-generating portion; and an in-group object information output portion that outputs object information, which is the object identifier acquired by the in-group object identifier-acquiring portion or information related to an object identified with the object identifier.

Furthermore, in this program, it is preferable that the object identifier-accepting portion receives one object identifier from a terminal apparatus, and the in-group object information output portion transmits object information, which is the object identifier acquired by the in-group object identifier-acquiring portion or information related to an object identified with the object identifier, to the terminal apparatus.

Furthermore, in this program, it is preferable that the computer is caused to further function as: an operation information-accepting portion that accepts the operation information; and an operation information-accumulating portion that accumulates the operation information accepted by the operation information-accepting portion in the operation information storage portion.

Embodiment 2

In this embodiment, the operations of two or more users on two or more objects (products, contents, services, etc.) are accepted, information on a link relationship between the objects is generated based on the operations, and one or more objects belonging to the same group as one object is acquired based on information on the link relationship and output. Furthermore, the operations herein refer to the input of information performed by a user. The information input by a user is, for example, a color or keyword indicating an impression of an object. FIG. 1 is a conceptual diagram of an information-processing system 2 in this embodiment.

Figure 18:
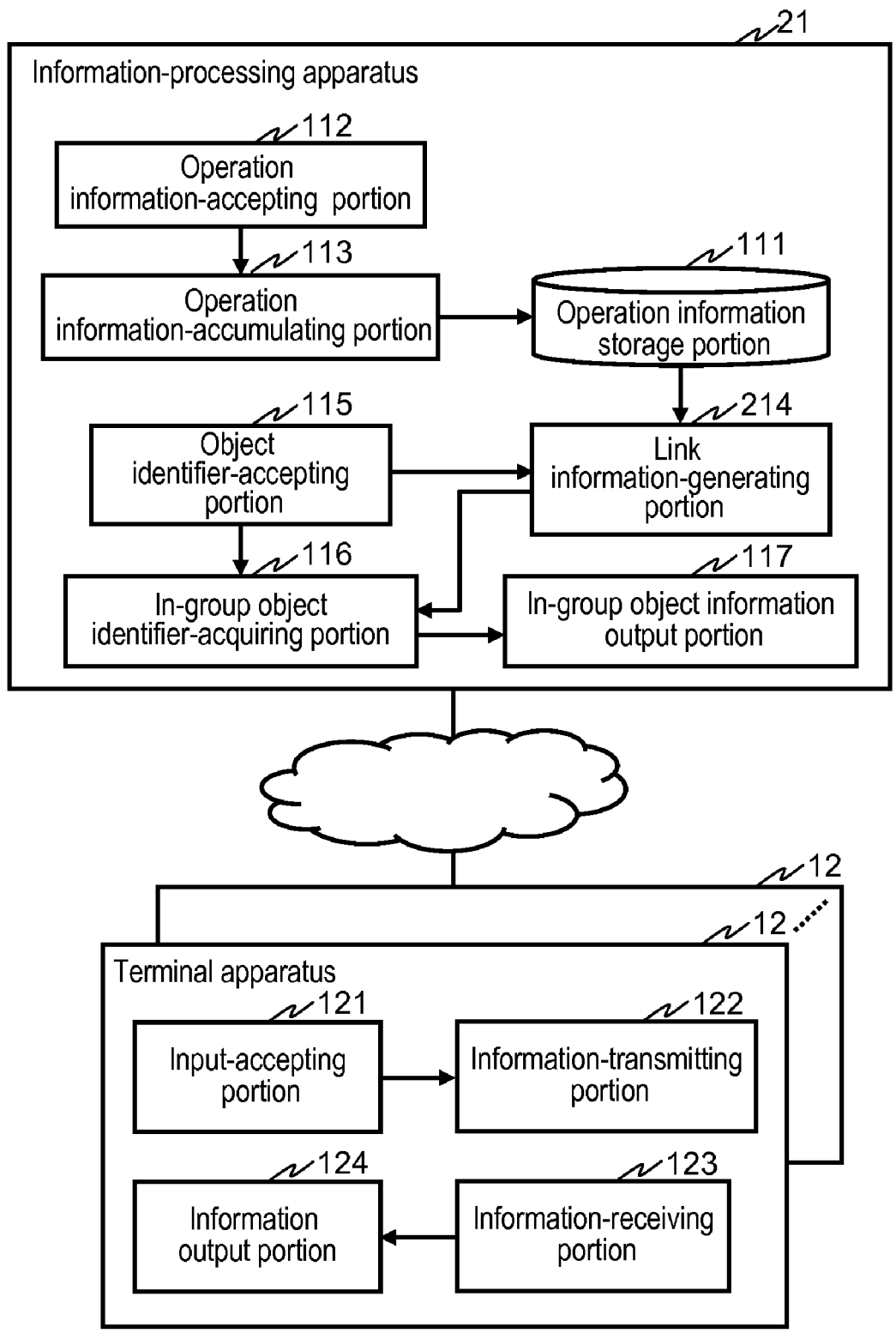
FIG. 18 is a block diagram of an information-processing system in Embodiment 2.

FIG. 18 is a block diagram of the information-processing system 2 in this embodiment. The information-processing system 2 includes an information-processing apparatus 21 and terminal apparatuses 12.

The information-processing apparatus 21 includes the operation information storage portion 111, the operation information-accepting portion 112, the operation information-accumulating portion 113, a link information-generating portion 214, the object identifier-accepting portion 115, the in-group object identifier-acquiring portion 116, and the in-group object information output portion 117.

The link information-generating portion 214 generates link information. More specifically, the link information-generating portion 214 reads the two or more pieces of operation information from the operation information storage portion 111, detects two or more object identifiers linked via input information contained in the two or more pieces of operation information, and generates link information. Here, the link information refers to information indicating the link relationship between two or more objects and is information indicating the level of the link between the two or more objects. Furthermore, the operation information herein contains an object identifier and input information, which is information input by a user. The operation information also may contain a user identifier. The input information is, for example, color information indicating a user's impression of an object identified with the object identifier. Also, the input information is, for example, a keyword indicating a user's impression of an object identified with the object identifier. Furthermore, the phrase 'via input information' refers to, for example, the acquisition of pairs of object identifiers paired with 'the same input information', the acquisition of pairs of object identifiers paired with 'similar input information', the acquisition of pairs of object identifiers paired with 'the same input information with acceptable variance in notation', or the like. Here, 'similar input information' refers to, for example, 'good' and 'excellent', and it is assumed that groups of similar items of information are managed for the judgment. Also, 'similar input information' refers to, for example, an information group of warm colors such as 'red', 'pink', and 'yellow'. Furthermore, in 'similar input information', for example, all pieces of affirmative input information ('good', 'like', etc.) may be taken as similar information, and all pieces of negative input information ('bad', 'dislike', etc.) may be taken as similar information. Furthermore, 'the same input information with acceptable variance in notation' refers to, for example, 'EXCELLENT', 'Excellent', 'excellent', 'excel-lent', and the like, and it is assumed that 'the same input information with variance in notation' is managed. Furthermore, 'via input information' refers to, for example, the acquisition of all pairs of two object identifiers among two or more object identifiers paired with 'the same input information'. The link information-generating portion 214 may be realized typically as an MPU, a memory, or the like. Typically, the processing procedure of the link information-generating portion 214 is realized using software, and the software is stored in a storage medium such as a ROM. Note that the processing procedure also may be realized using hardware (dedicated circuit).

Figure 19:
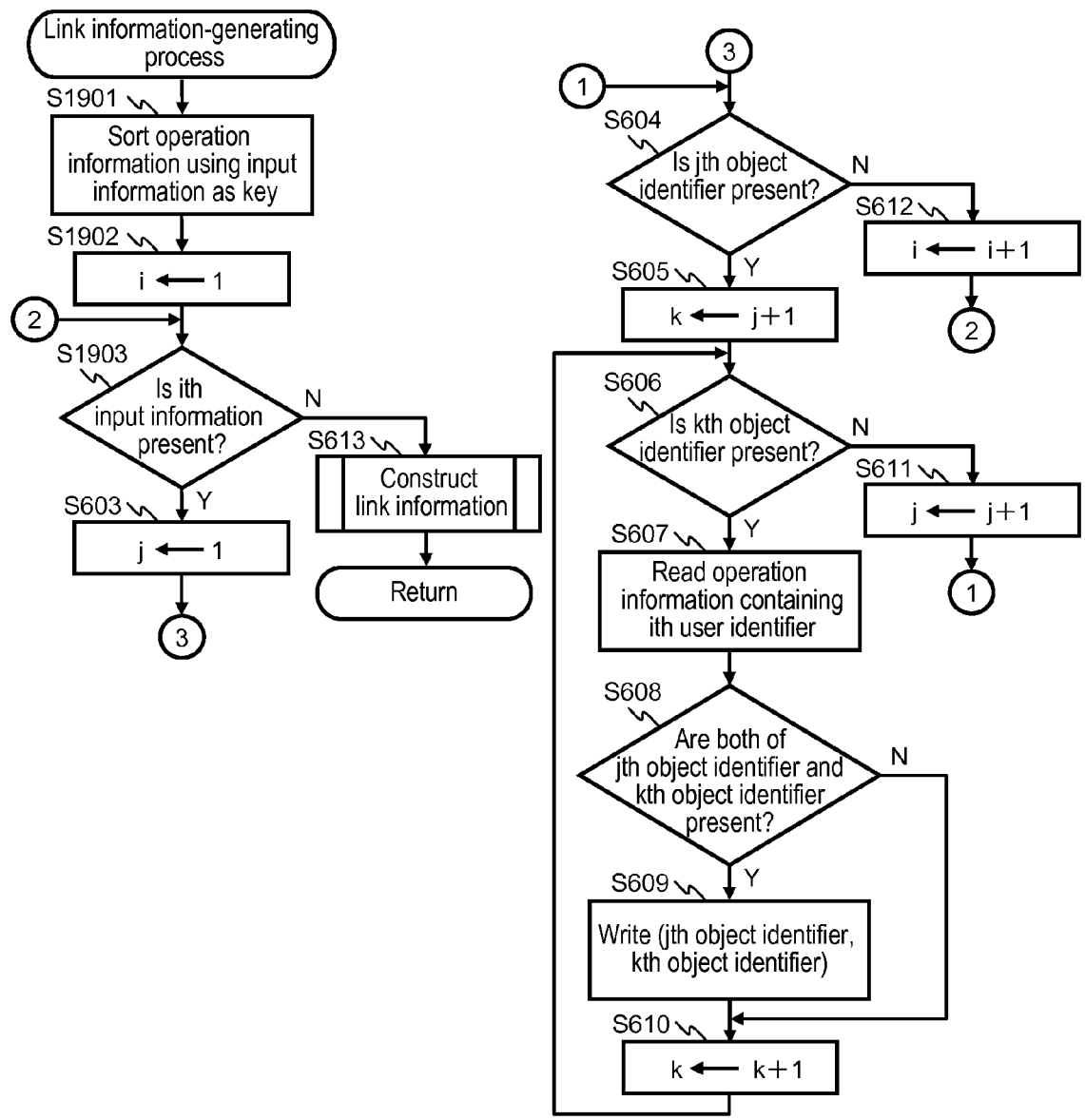
FIG. 19 is a flowchart illustrating the operation of a link information-generating process in this embodiment.

Next, the operation of the information-processing system 2 will be described. The operation of the information-processing system 2 is different from the operation of the information-processing system 1 in the link information-generating process. Accordingly, the link information-generating process performed by the link information-generating portion 214 will be described with reference to the flowchart in FIG. 19. A description of the other aspects of the operation of the information-processing system 2 has been omitted. In the flowchart in FIG. 19, a description of processing similar to that in the flowchart in FIG. 6 has been omitted.

(step S1901) The link information-generating portion 214 sorts operation information using input information as a key. Here, sorting is performed in order to put pieces of operation information having the same input information together so that the pieces of the operation are not separated from each other.

(step S1902) The link information-generating portion 214 substitutes 1 for a counter i.

(step S1903) The link information-generating portion 214 judges whether or not the ith input information is present in the operation information sorted in step S1901. If the ith input information is present, the procedure proceeds to step S603. If the ith input information is not present, the procedure proceeds to step S613. Here, in judging the presence of the ith input information, input information that is the same as already processed input information is not taken into consideration. That is to say, the ith input information refers to the ith type of input information.

Hereinafter, a specific operation of the information-processing system in this embodiment will be described. FIG. 1 is a conceptual diagram of the information-processing system.

Figure 20:
FIG. 20 is a diagram showing an object management table in this embodiment.
Figure 20:
Figure 20:
Figure 20:
Figure 20:
Figure 20:
Figure 20:
Figure 20:
Figure 20:
Figure 20:

As in the specific example of Embodiment 1, it is assumed that the object management table shown in FIG. 20 is held in a server apparatus (not shown) or the information-processing apparatus 11. It is assumed that, if the object management table is held in the server apparatus, the server apparatus is connected to a network. The object management table shown in FIG. 20 is a table for managing music information, and has 'ID', 'object identifier', and 'object'. Here, 'ID' is information for identifying records in the table, and is for managing the table. 'Object identifier' is information for identifying objects, and is an object ID in this example. Here, 'object identifier' may be a music title or the like. An 'object' has a 'music title', 'genre', 'jacket (image)', and the like. 'Music title' refers to the name of a piece of music. 'Genre' refers to the genre of the piece of music. 'Jacket (image)' refers to the image data for a music jacket.

Figure 21:
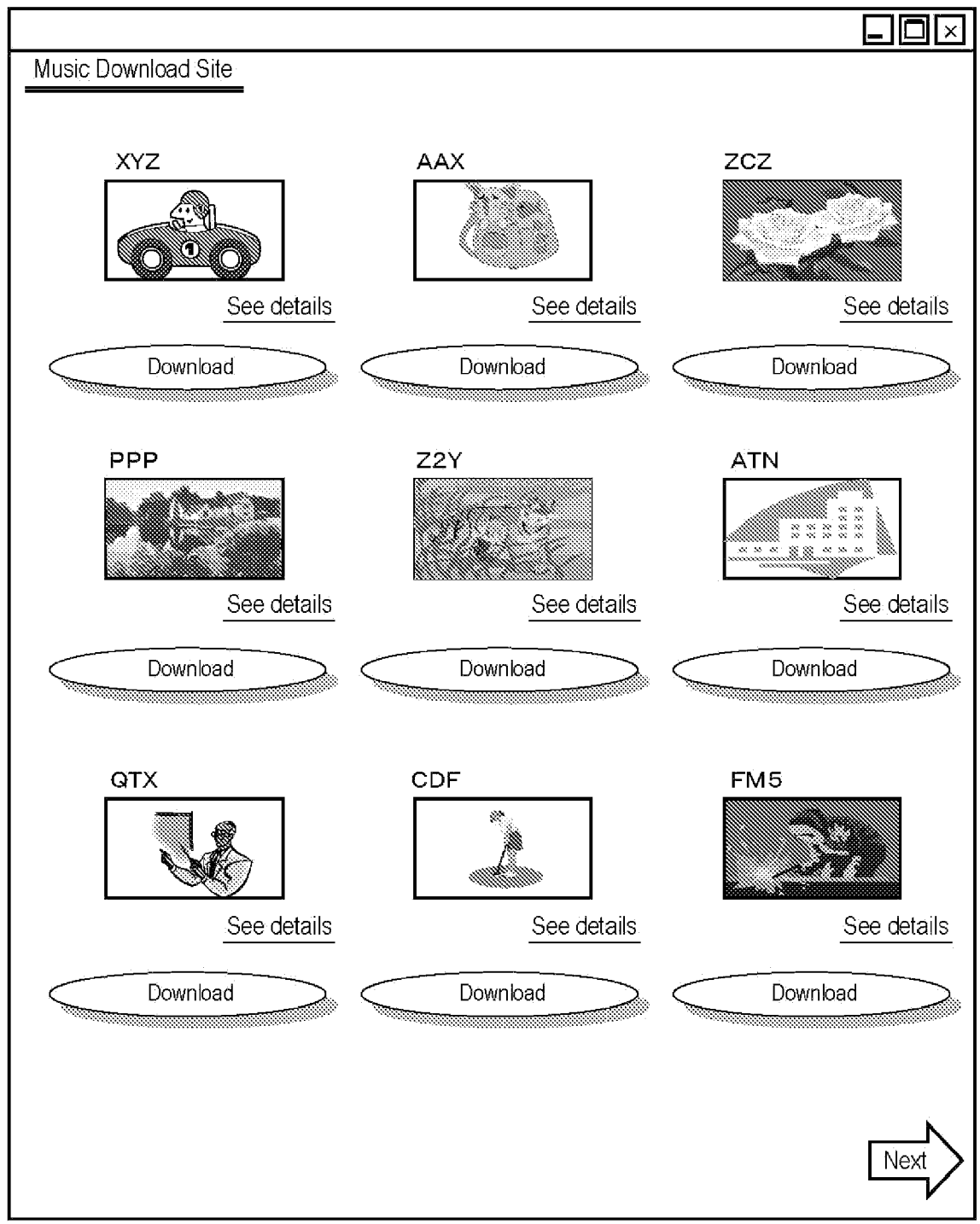
FIG. 21 is a view showing a screen example of a website in this embodiment.

It is assumed that the user A of the terminal apparatus 12 accesses an apparatus in which the object management table is held (hereinafter, this apparatus is taken as the information-processing apparatus 11) and logs into a site for the download sale of music (referred to as a 'site X'). For example, it is assumed that the terminal apparatus 12 receives the site X from the information-processing apparatus 11, executes the script of the website, and displays a screen as shown in FIG. 21. Here, it is assumed that the user A inputs the user identifier 'A' when logging into the site.

Next, it is assumed that the user has selected music (e.g., music with the object identifier '1') that the user wants to download (the user has moved the focus and pressed a download button), while viewing a screen in FIG. 21. Subsequently, the input-accepting portion 121 accepts the user identifier 'A' and the object identifier '1'. Then, the information-transmitting portion 122 constructs the information 'user identifier: A, object identifier: 1', and transmits the information to the information-processing apparatus 21. Here, the information 'user identifier: A, object identifier: 1' indicates that the user A will download music identified with the object identifier '1'. Then, the information-processing apparatus 21 accepts the information 'user identifier: A, object identifier: 1', and transmits the music identified with the object identifier '1' to the terminal apparatus 12. Then, the terminal apparatus 12 receives and outputs the music identified with the object identifier '1'.

Figure 22:
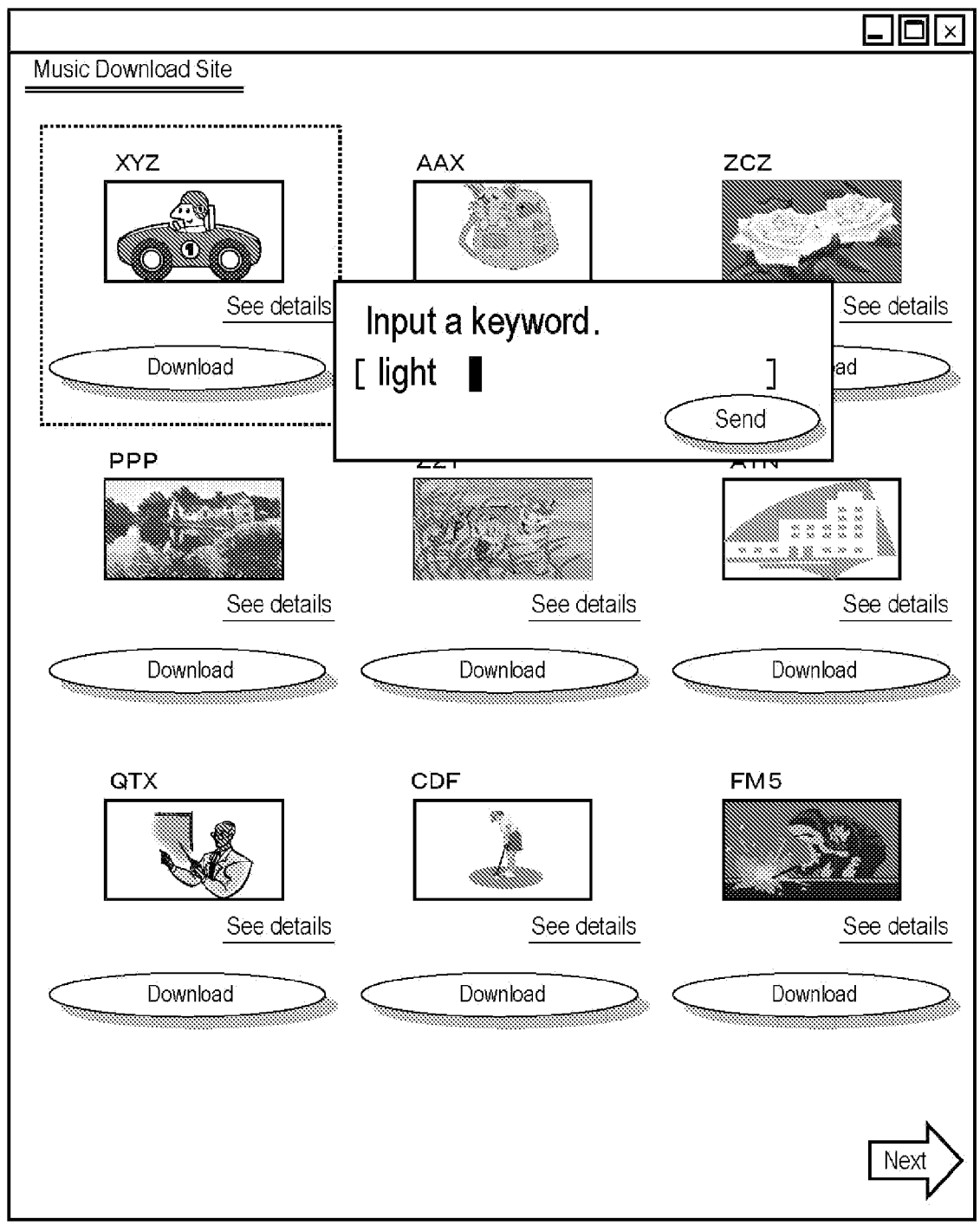
FIG. 22 is a view showing an input screen example of input information in this embodiment.

Then, the user A listens to the music identified with the object identifier '1', and inputs the keyword 'light' indicating an impression of the music as shown in FIG. 22. Then, it is assumed that the user A presses a 'transmission' button. Here, it is assumed that, in the terminal apparatus 12, after the music is output, a window for inputting keywords is displayed as shown in FIG. 22.

Subsequently, the input-accepting portion 121 of the terminal apparatus 12 accepts the object identifier '1' and the keyword 'light'. Then, the information-transmitting portion 122 transmits the operation information 'user identifier: A, object identifier: 1, keyword: light' to the information-processing apparatus 21.

Next, the operation information-accepting portion 112 of the information-processing apparatus 21 receives the operation information 'user identifier: A, object identifier: 1, keyword: light'. Then, the operation information-accumulating portion 113 accumulates the received operation information in the operation information storage portion 111.

It is assumed that users such as a user B and a user C who are not the user A also have downloaded music and input a keyword as described above. It is assumed that the operation information-accumulating portion 113 of the information-processing apparatus 21 has performed processing similar to the above-described processing, and accumulated the operation information in the operation information storage portion 111. Then, it is assumed that the operation information management table shown in FIG. 23 has been accumulated in the operation information storage portion 111. In the operation information management table herein, operation information, which is information on a keyword provided by a user who has listened to music, is stored. In the operation information management table, one or more records having an 'ID' and 'operation information' are stored. 'Operation information' has a 'user identifier', an 'object identifier', and a 'keyword'. Here, the keyword is a type of input information.

Figure 24:
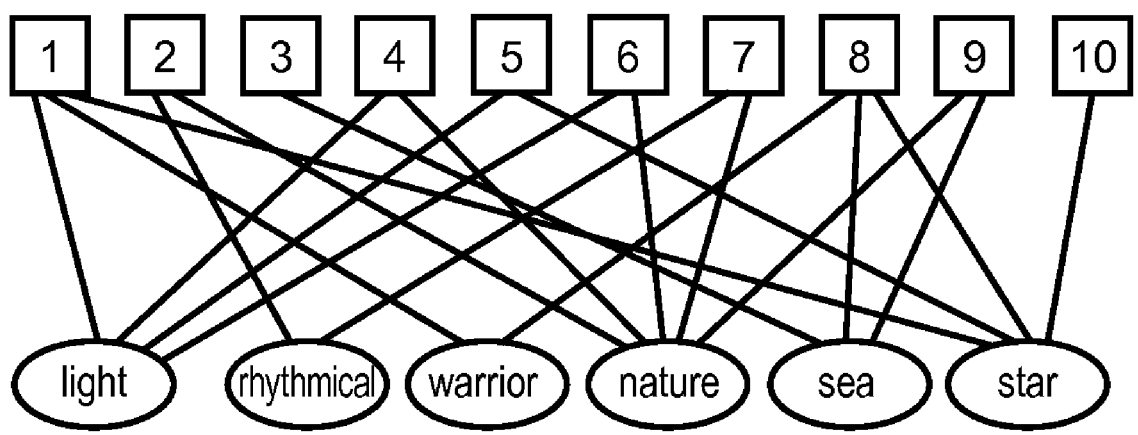
FIG. 24 is a conceptual diagram of a bipartite graph in this embodiment.

Furthermore, a network in which the object identifiers and the keywords in the operation information management table in FIG. 23 exist as nodes is shown, for example, in FIG. 24. FIG. 24 shows a bipartite graph obtained by changing the user identifiers of the bipartite graph in FIG. 15 in Embodiment 1 into keywords input by users. That is to say, even if users perform the same operation (e.g., download, purchase, bookmarking, etc.) on a given object (e.g., music, a product, etc.), users' impressions of and feelings about the object may be different from each other. Accordingly, actually related objects can be grouped, and the precision in recommending products and the like can be improved, by forming a bipartite graph using keywords (may be a color or the like described above) indicating this sort of users' impressions and feelings, performing a process described below, and grouping the object identifiers. Here, the network is comprised of lines and nodes.

Then, the link information-generating portion 214 performs the link information-generating process as follows based on the information in FIG. 23. That is to say, the link information-generating portion 214 sorts the records in the operation information management table in FIG. 23 using input information as a key, following the operation in the flowchart in FIG. 19. Here, sorting is performed in order to put records having the same input information together. Then, the link information-generating portion 214 acquires the first input information 'light'. Next, the link information-generating portion 214 reads all pieces of operation information containing the first input information 'light' from the operation information storage portion 111. Then, the link information-generating portion 214 obtains the operation information '(1, light) (4, light) (5, light) (6, light)'. Next, the link information-generating portion 214 obtains all combinations of two object identifiers '(1, 4) (1, 5) (1, 6) (4, 5) (4, 6) (5, 6)' from the operation information '(1, light) (4, light) (5, light) (6, light)'. Then, the link information-generating portion 114 writes the pairs of two object identifiers '(1, 4) (1, 5) (1, 6) (4, 5) (4, 6) (5, 6)' to a buffer. It will be appreciated that the process of sorting records is not an essential process.

Next, the link information-generating portion 214 acquires the second input information 'rhythmical'. Then, the link information-generating portion 214 reads all pieces of operation information containing the second input information 'rhythmical' from the operation information storage portion 111. Then, the link information-generating portion 214 obtains the operation information '(2, rhythmical) (7, rhythmical)'. Next, the link information-generating portion 214 obtains a pair of two object identifiers '(2, 7)' from the operation information '(2, rhythmical) (7, rhythmical)'.

The link information-generating portion 214 adds the pair of two object identifiers '(2, 7)' to the buffer. The link information-generating portion 214 performs this sort of processing also for the third and following pieces of input information 'warrior', 'nature', 'sea', and 'star'. Then, the link information-generating portion 214 obtains the data group shown in FIG. 25. Data constituting the data group in FIG. 25 has the structure of (jth object identifier, kth object identifier).

Next, the link information-generating portion 214 puts the same pairs (jth object identifier, kth object identifier) together using the data group in FIG. 25, and obtains the link information group in FIG. 26. The link information herein is (jth object identifier, kth object identifier, the number). Here, 'the number' refers to the number of pairs (jth object identifier, kth object identifier), and indicates the level of the link between 'the jth object identifier' and 'the kth object identifier'. Then, the link information-generating portion 214 accumulates the link information group in FIG. 26 in the storage medium. This storage medium may be a volatile storage medium, or may be a non-volatile storage medium.

Figure 27:
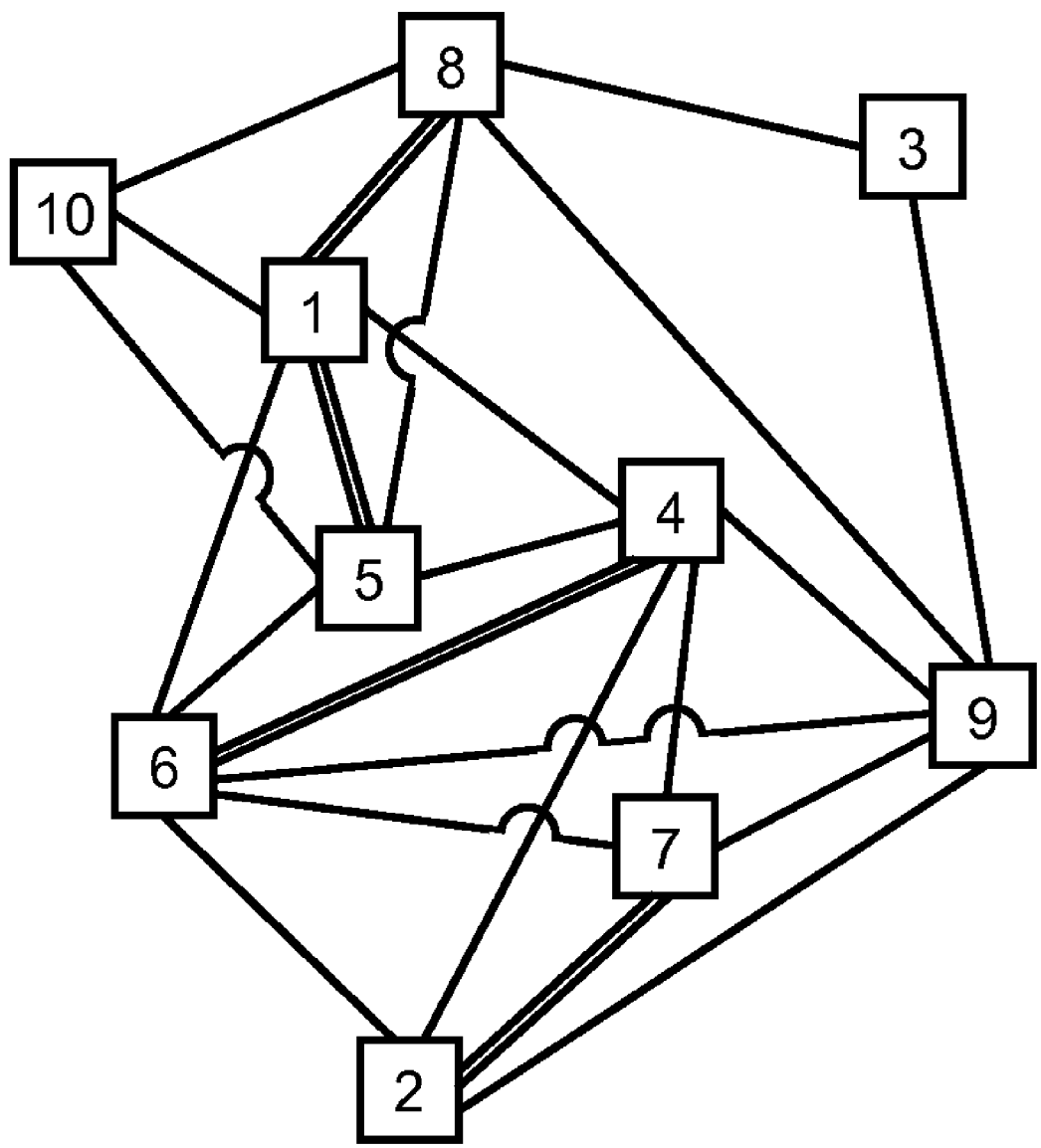
FIG. 27 is a conceptual diagram of a unipartite graph in this embodiment.

The process in which the link information-generating portion 214 acquires the data group in FIG. 25, and then acquires the link information group in FIG. 26 is a process of forming the unipartite graph in FIG. 27 based on the bipartite graph in FIG. 24.

For example, it is assumed that, in this status, the user C has used the terminal apparatus 12 to access the site X, and performed an operation for bookmarking the music 'ZCZ'. Then, the input-accepting portion 121 accepts information to the effect that the music 'ZCZ' has been bookmarked. Then, the information-transmitting portion 122 constructs the information 'user identifier: C, object identifier: 3', and transmits the information to the information-processing apparatus 21. Here, it is assumed that the information-transmitting portion 122 acquires information indicating that the object identifier corresponding to the music 'ZCZ' is '3', from the website information in FIG. 21.

Next, the object identifier-accepting portion 115 receives the information containing the object identifier '3'. Then, the in-group object identifier-acquiring portion 116 acquires an object identifier group in the group as follows. That is to say, the in-group object identifier-acquiring portion 116 acquires all object identifiers directly linked from the object identifier '3', using the fifth algorithm described in Embodiment 1. Then, the in-group object identifier-acquiring portion 116 obtains '8' and '9'. Next, the object identifier '1' linked with the object identifier '8' or '9' at a link level of '2' or higher is acquired. As a result, the in-group object identifier-acquiring portion 116 acquires the object identifiers '1', '8', and '9', and arranges them in the memory. Herein, the threshold value in the fifth algorithm is '2'.

Next, the in-group object information output portion 117 uses the object identifiers '1', '8', and '9', to acquire object information, which is information related to an object identified with the object identifier. First, the in-group object information output portion 117 judges whether or not an object identifier of an object that the user C has downloaded and input a keyword thereto is present among the object identifiers '1', '8', and '9'. Here, the in-group object information output portion 117 searches the operation information management table in FIG. 11 using the user identifier 'C' as a key, and acquires an object identifier. Then, the in-group object information output portion 117 performs a process of eliminating the acquired object identifier from the object identifiers '1', '8', and '9'. Herein, the object identifier that is to be eliminated is '9' (see the record with 'ID=10' in FIG. 23), and, thus, the in-group object information output portion 117 finally acquires the object identifiers '1' and '8', and arranges them in the memory. Here, the in-group object information output portion 117 may acquire two or more object identifiers.

Next, the in-group object information output portion 117 reads object information (e.g., 'music title', 'jacket', etc.) from the object management table in FIG. 20, using each of the object identifiers '1' and '8' as a key.

Next, the in-group object information output portion 117 transmits the read object information ('music title', 'jacket', etc. corresponding to the object identifiers '1' and '8') to the terminal apparatus 12.

Next, the information-receiving portion 123 of the terminal apparatus 12 receives the object information ('music title', 'jacket', etc. corresponding to the object identifiers '1' and '8'). Next, the information output portion 124 outputs the received object information on a display screen. Here, this object information is information on music recommended for the user C. Furthermore, the object information is information on music having a certain relationship with the music downloaded by the user C.

As described above, according to this embodiment, the precision in recommending products and the like can be further improved. More specifically, according to this embodiment, a search of information on products and the like can be performed with better serendipity. This sort of processing is particularly effective for a search of sensitive objects such as music, movies, and paintings. That is to say, even if users perform the same operation (e.g., download, purchase, bookmarking, etc.) on a given object (e.g., music, a product, etc.), users' impressions of and feelings about the object may be different from each other. Accordingly, actually related objects can be grouped, and a search of information on products and the like can be performed with better serendipity, by grouping the object identifiers using input information (a keyword, a color, or the like indicating an impression or feeling) input by the users. An operation of grouping the object identifiers realizes an operation of grouping mutually related objects while linking the sensitivities of various users, and, thus, new user experiences (e.g., music experiences in the case of music) can be provided.

Here, according to this embodiment, there is no limitation on the algorithm for generating the link information. For example, in this embodiment, the link information-generating portion 214 linked object identifiers paired with 'the same input information'. However, the link information-generating portion 214 may link object identifiers of objects to which the same user has added some sort of input information (there is no limitation on the content of the input information). Furthermore, the link information-generating portion 214 may link object identifiers of objects to which the same user has added the same input information. That is to say, using input information input by users on objects, two or more object identifiers linked via this input information may be linked.

Furthermore, according to this embodiment, users freely input keywords indicating their own impressions of and feelings about objects (e.g., music). However, users may select keywords indicating their own impressions and feelings from among predetermined keywords. Furthermore, users may select colors suitable for objects from among predetermined colors.

The software that realizes the information-processing apparatus in this embodiment may be the following program. Specifically, this program is a program for causing a computer to function as: a link information-generating portion that reads at least two pieces of operation information having a user identifier for identifying a user and an object identifier for identifying an object on which the user has performed an operation, detects at least two object identifiers linked via a user identifier contained in the at least two pieces of operation information, and generates link information, which is information indicating a link relationship between at least two objects and is information indicating the level of the link between the at least two objects; an object identifier-accepting portion that accepts one object identifier; an in-group object identifier-acquiring portion that acquires an object identifier having at least a predetermined level of relevance with the one object identifier accepted by the object identifier-accepting portion, using the link information generated by the link information-generating portion; and an in-group object information output portion that outputs object information, which is the object identifier acquired by the in-group object identifier-acquiring portion or information related to an object identified with the object identifier.

Furthermore, in this program, it is preferable that the operation information contains an object identifier and input information, which is information input by a user, and the link information-generating portion reads at least two pieces of operation information, detects at least two object identifiers linked via input information contained in the at least two pieces of operation information, and generates link information, which is information indicating a link relationship between at least two objects and is information indicating the level of the link between the at least two objects.

Furthermore, in this program, it is preferable that the object identifier-accepting portion receives one object identifier from a terminal apparatus, and the in-group object information output portion transmits object information, which is the object identifier acquired by the in-group object identifier-acquiring portion or information related to an object identified with the object identifier, to the terminal apparatus.

Furthermore, in this program, it is preferable that the computer is caused to further function as: an operation information-accepting portion that accepts the operation information; and an operation information-accumulating portion that accumulates the operation information accepted by the operation information-accepting portion in the operation information storage portion.

Figure 28:
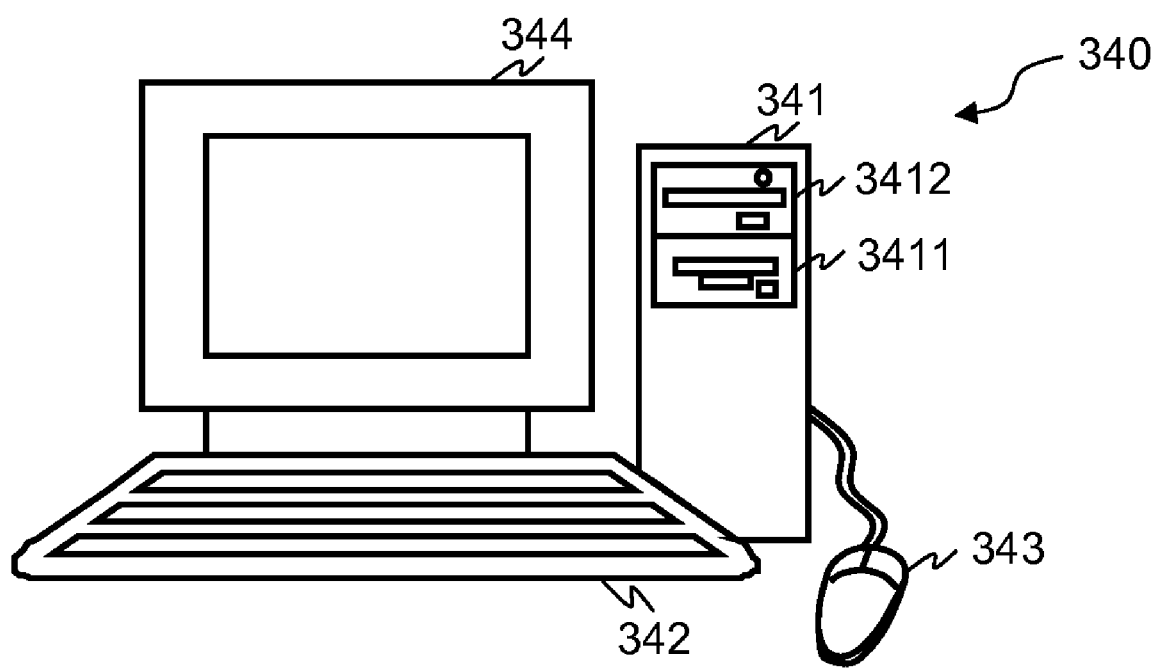
FIG. 28 is a schematic view of a computer system in this embodiment.
Figure 29:
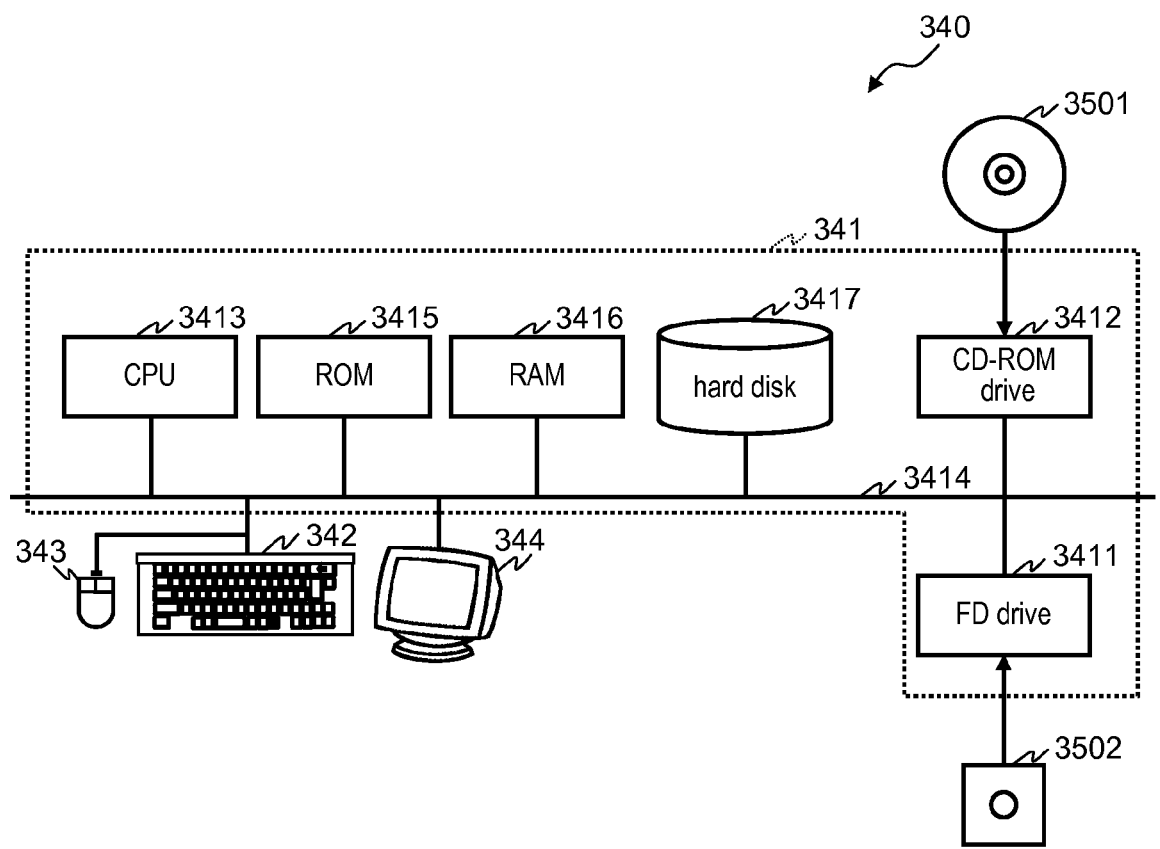
FIG. 29 is a block diagram of the computer system in this embodiment.

FIG. 28 shows the external appearance of a computer that executes the programs described in this specification to realize the information-processing apparatus and the like in the foregoing embodiments. The foregoing embodiments may be realized using computer hardware and a computer program executed thereon. FIG. 28 is a schematic view of a computer system 340. FIG. 29 is a block diagram of the computer system 340.

In FIG. 28, the computer system 340 includes a computer 341 including an FD (flexible disk) drive and a CD-ROM (compact disk read only memory) drive, a keyboard 342, a mouse 343, and a monitor 344.

In FIG. 29, the computer 341 includes not only the FD drive 3411 and the CD-ROM drive 3412, but also a CPU (central processing unit) 3413, a bus 3414 that is connected to the CD-ROM drive 3412 and the FD drive 3411, a ROM (read-only memory) 3415 in which a program such as a startup program is to be stored, a RAM (random access memory) 3416 that is connected to the CPU 3413 and in which a command of an application program is temporarily stored and a temporary storage area is to be provided, and a hard disk 3417 in which an application program, a system program, and data are to be stored. Although not shown, the computer 341 may further include a network card that provides connection to a LAN.

The program for causing the computer system 340 to execute the functions of the information-processing apparatus and the like in the foregoing embodiments may be stored in a CD-ROM 3501 or an FD 3502, inserted into the CD-ROM drive 3412 or the FD drive 3411, and transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program to cause the computer 341 to execute the functions of the information-processing apparatus and the like in the foregoing embodiments. The program may only include a command portion to call an appropriate function (module) in a controlled mode and obtain desired results. The manner in which the computer system 340 operates is well known, and, thus, a detailed description thereof has been omitted.

It should be noted that, in the program, in a step of transmitting information, a step of receiving information, or the like, a process that is performed by hardware, for example, a process performed by a modem or an interface card in the transmitting step (a process that can be performed only by hardware) is not included.

Furthermore, the computer that executes this program may be a single computer, or may be multiple computers. More specifically, centralized processing may be performed, or distributed processing may be performed.

Furthermore, in the foregoing embodiments, it will be appreciated that two or more communication units (an information-transmitting portion, an information-receiving portion, etc.) in one apparatus may be physically realized as one medium.

Furthermore, in the foregoing embodiments, each processing (each function) may be realized as integrated processing using a single apparatus (system), or may be realized as distributed processing using multiple apparatuses.

The present invention is not limited to the embodiments set forth herein. Various modifications are possible within the scope of the present invention.

As described above, the information-processing system according to the present invention has an effect that improves the precision in recommending products and the like, and, thus, this system is useful, for example, as an information-processing system.

What is claimed is:

1. An information-processing apparatus, comprising:
an operation information storage portion that stores at least two pieces of operation information, the at least two pieces of operation information comprising a user identifier for identifying a user and at least one object identifier for identifying at least one object on which the user has performed an operation;
a link information-generating portion that reads the at least two pieces of operation information from the operation information storage portion, detects at least two object identifiers for identifying at least two objects, which are linked via the user identifier contained in the at least two pieces of operation information, and generates link information, which is information indicating a link relationship between the at least two objects and a level of the link relationship between the at least two objects;
an object identifier-accepting portion that accepts an object identifier;
an in-group object identifier-acquiring portion that acquires at least two object identifiers having at least a predetermined level of relevance with the object identifier accepted by the object identifier-accepting portion, using the link information generated by the link information-generating portion; and
an in-group object information output portion that outputs object information, which is information related to the at least two object identifiers acquired by the in-group object identifier-acquiring portion, or information related to an object identified with the at least two object identifiers acquired by the in-group object identifier-acquiring portion,
wherein the link information-generating portion creates a unipartite graph using the at least two object identifiers by eliminating the user identifier from a bipartite graph comprising the at least two object identifiers and the user identifier, wherein the in-group object identifier-acquiring portion acquires the at least one object identifier being directly linked with the object identifier accepted by the object identifier-accepting portion, and wherein the in-group object identifier-acquiring portion uses link levels to additionally acquire another at least one object identifier that is directly linked with the at least one object identifier directly linked with the object identifier accepted by the object identifier-accepting portion.

2. The information-processing apparatus according to claim 1, wherein the at least two pieces of operation information further comprises input information, which is information input by the user pertaining to the at least one object on which the user has performed the operation, wherein the link information-generating portion reads the at least two pieces of operation information from the operation information storage portion, detects the at least two object identifiers for identifying the at least two objects, which are linked via the input information contained in the at least two pieces of operation information, and generates the link information, which is the information indicating the link relationship between the at least two objects and the level of the link relationship between the at least two objects, and wherein the link information-generating portion creates the unipartite graph using the at least two object identifiers by eliminating the input information from a bipartite graph comprising the at least two object identifiers and the input information.

3. The information-processing apparatus according to claim 2, wherein the input information is color information indicating a user's impression of the at least one object identified with the at least one object identifier.

4. The information-processing apparatus according to claim 2, wherein the input information is a keyword indicating a user's impression of the at least one object identified with the at least one object identifier.

5. The information-processing apparatus according to claim 1, wherein the object identifier-accepting portion receives the object identifier from a terminal apparatus, and the in-group object information output portion transmits the object information to the terminal apparatus.

6. The information-processing apparatus according to claim 2, wherein the object identifier-accepting portion receives the object identifier from a terminal apparatus, and the in-group object information output portion transmits the object information to the terminal apparatus.

7. The information-processing apparatus according to claim 3, wherein the object identifier-accepting portion receives the object identifier from a terminal apparatus, and the in-group object information output portion transmits the object information to the terminal apparatus.

8. The information-processing apparatus according to claim 4, wherein the object identifier-accepting portion receives the object identifier from a terminal apparatus, and the in-group object information output portion transmits the object information to the terminal apparatus.

9. The information-processing apparatus according to claim 1, further comprising:

an operation information-accepting portion that accepts the at least two pieces of operation information; and an operation information-accumulating portion that accumulates the at least two pieces of operation information accepted by the operation information-accepting portion in the operation information storage portion.

10. The information-processing apparatus according to claim 2, further comprising:

an operation information-accepting portion that accepts the at least two pieces of operation information; and an operation information-accumulating portion that accumulates the at least two pieces of operation information accepted by the operation information-accepting portion in the operation information storage portion.

11. The information-processing apparatus according to claim 3, further comprising:

an operation information-accepting portion that accepts the at least two pieces of operation information; and an operation information-accumulating portion that accumulates the at least two pieces of operation information accepted by the operation information-accepting portion in the operation information storage portion.

12. The information-processing apparatus according to claim 4, further comprising:

an operation information-accepting portion that accepts the at least two pieces of operation information; and an operation information-accumulating portion that accumulates the at least two pieces of operation information accepted by the operation information-accepting portion in the operation information storage portion.

13. The information-processing apparatus according to claim 5, further comprising:

an operation information-accepting portion that accepts the at least two pieces of operation information; and an operation information-accumulating portion that accumulates the at least two pieces of operation information accepted by the operation information-accepting portion in the operation information storage portion.

14. The information-processing apparatus according to claim 6, further comprising:

an operation information-accepting portion that accepts the at least two pieces of operation information; and an operation information-accumulating portion that accumulates the at least two pieces of operation information accepted by the operation information-accepting portion in the operation information storage portion.

15. The information-processing apparatus according to claim 7, further comprising:

an operation information-accepting portion that accepts the at least two pieces of operation information; and an operation information-accumulating portion that accumulates the at least two pieces of operation information accepted by the operation information-accepting portion in the operation information storage portion.

16. The information-processing apparatus according to claim 8, further comprising:

an operation information-accepting portion that accepts the at least two pieces of operation information; and an operation information-accumulating portion that accumulates at least two pieces of the operation information accepted by the operation information-accepting portion in the operation information storage portion.

17. An information-processing method that can be realized using a link information-generating portion, an object identifier-accepting portion, an in-group object identifier-acquiring portion, and an in-group object information output portion, which are stored in a non-transitory information-processing apparatus, comprising:

a link information-generating step, using the link information-generating portion, of reading at least two pieces of operation information comprising a user identifier for identifying a user and an object identifier for identifying an object on which the user has performed an operation, detecting at least two object identifiers for identifying at least two objects, which are linked via the user identifier contained in the at least two pieces of operation information, and generating link information, which is information indicating a link relationship between the at least two objects and a level of the link relationship between the at least two objects;

an object identifier-accepting step, using the object identifier-accepting portion, of accepting an object identifier;

an in-group object identifier-acquiring step using the in-group object identifier-acquiring portion, of acquiring at least two object identifiers having at least a predetermined level of relevance with the object identifier accepted in the object identifier-accepting step, using the link information generated in the link information-generating step; and an in-group object information output step, using the in-group object information output portion, of outputting object information, which is information related to the at least two object identifiers acquired in the in-group object identifier-acquiring step, or information related to an object identified with the at least two object identifiers acquired in the in-group object identifier-acquiring step, wherein the link information-generating portion creates a unipartite graph using the at least two object identifiers by eliminating the user identifier from a bipartite graph comprising the at least two object identifiers and the user identifier, wherein the in-group object identifier-acquiring portion acquires the at least two object identifiers based on at least one object identifier being directly linked with the object identifier accepted by the object identifier-accepting portion, wherein the in-group object identifier-acquiring portion acquires the at least one object identifier being directly linked with the object identifier accepted by the object identifier-accepting portion, and wherein the in-group object identifier-acquiring portion uses link levels to additionally acquire another at least one object identifier that is directly linked with the at least one object identifier directly linked with the object identifier accepted by the object identifier-accepting portion.

18. The information-processing method according to claim 17, wherein the at least two pieces of operation information further comprises input information, which is information input by the user pertaining to the at least one object on which the user has performed the operation, in the link information-generating step, the at least two pieces of operation information are read, the at least two object identifiers for identifying the at least two objects, which are linked via the input information contained in the at least two pieces of operation information are detected, and the link information, which is the information indicating the link relationship between the at least two objects and the level of the link relationship between the at least two objects, is generated, wherein the link information-generating portion creates the unipartite graph using the at least two object identifiers by eliminating the input information from a bipartite graph comprising the at least two object identifiers and the input information.

19. A non-transitory computer-readable storage medium in which a program is stored, the program being for causing a computer to function as:

a link information-generating portion that reads at least two pieces of operation information comprising a user identifier for identifying a user and an object identifier for identifying an object on which the user has performed an operation, detects at least two object identifiers for identifying at least two objects, which are linked via the user identifier contained in the at least two pieces of operation information, and generates link information, which is information indicating a link relationship between the at least two objects and a level of the link relationship between the at least two objects;

an object identifier-accepting portion that accepts an object identifier;

an in-group object identifier-acquiring portion that acquires the at least two object identifiers having at least a predetermined level of relevance with the object identifier accepted by the object identifier-accepting portion, using the link information generated by the link information-generating portion; and an in-group object information output portion that outputs object information, which is information related to the at least two object identifiers acquired by the in-group object identifier-acquiring portion, or information related to an object identified with the at least two object identifiers acquired by the in-group object identifier-acquiring portion, wherein the link information-generating portion creates a unipartite graph using the at least two object identifiers by eliminating the user identifier from a bipartite graph comprising the at least two object identifiers and the user identifier, wherein the in-group object identifier-acquiring portion acquires the at least one object identifier being directly linked with the object identifier accepted by the object identifier-accepting portion, and wherein the in-group object identifier-acquiring portion uses link levels to additionally acquire another at least one object identifier that is directly linked with the at least one object identifier directly linked with the object identifier accepted by the object identifier-accepting portion.

20. The computer-readable storage medium according to claim 19, wherein the at least two pieces of operation information further comprises input information, which is information input by the user pertaining to the at least one object on which the user has performed the operation, the link information-generating portion reads the at least two pieces of operation information, detects at least two object identifiers for identifying the at least two objects, which are linked via the input information contained in the at least two pieces of operation information, and generates the link information, which is the information indicating the link relationship between the at least two objects and the level of the link relationship between the at least two objects, and wherein the link information-generating portion creates the unipartite graph using the at least two object identifiers by eliminating the input information from a bipartite graph comprising the at least two object identifiers and the input information.

* * * * *